United States Patent
Chu

(10) Patent No.: US 10,576,438 B2
(45) Date of Patent: *Mar. 3, 2020

(54) SYSTEM FOR PRODUCING HIGH-PURITY GRANULAR SILICON

(71) Applicant: Xi Chu, Beijing (CN)

(72) Inventor: Xi Chu, Beijing (CN)

(*) Notice: Subject to any disclaimer, the term of this patent is extended or adjusted under 35 U.S.C. 154(b) by 11 days.

This patent is subject to a terminal disclaimer.

(21) Appl. No.: 15/694,792

(22) Filed: Sep. 2, 2017

(65) Prior Publication Data

US 2017/0361292 A1    Dec. 21, 2017

Related U.S. Application Data

(63) Continuation of application No. 13/969,556, filed on Aug. 17, 2013, now Pat. No. 9,751,066, which is a
(Continued)

(51) Int. Cl.
*B01J 8/12* (2006.01)
*C01B 33/027* (2006.01)
(Continued)

(52) U.S. Cl.
CPC .............. *B01J 8/008* (2013.01); *B01J 8/087* (2013.01); *B01J 8/12* (2013.01); *B01J 8/16* (2013.01);
(Continued)

(58) Field of Classification Search
None
See application file for complete search history.

(56) References Cited

U.S. PATENT DOCUMENTS 3,012,861 A   12/1961  Ling
3,012,862 A   12/1961  Bertrand et al.
(Continued)

FOREIGN PATENT DOCUMENTS

JP    58185426 A  * 10/1983 ........... C23C 16/442
JP    60005013 A  *  1/1985
(Continued)

OTHER PUBLICATIONS

Machine Translation for Japanese Application H04-306354, corresponding to JP 06-127927 A. Retrieved from JPO website on Jul. 15, 2019. (Year: 2019).*

*Primary Examiner* — Jennifer A Leung
(74) *Attorney, Agent, or Firm* — Charlotte C. Wilson

(57) ABSTRACT

The present disclosure provides a reactor and a method for the production of high purity silicon granules. The reactor includes a reactor chamber; and the reaction chamber is equipped with a solid feeding port, auxiliary gas inlet, raw material gas inlet, and exhaust gas export. The reaction chamber is also equipped with an internal gas distributor; a preheating unit; and an external exhaust gas processing unit connected between the preheating unit and a gas inlet. The reaction chamber is further equipped with a surface finishing unit, a heating unit, and a dynamics-generating unit. The reaction occurs through decomposition of silicon-containing gas in a densely stacked, high purity granular silicon layer reaction bed in relative motion, and uses the exhaust gas for heating. The present invention achieves a large-scale, efficient, energy-saving, continuous, low-cost production of high purity silicon granules.

14 Claims, 14 Drawing Sheets

Related U.S. Application Data continuation of application No. 13/043,155, filed on Mar. 8, 2011, now Pat. No. 8,535,614.

(51) Int. Cl.

| | | |
|---|---|---|
| *B01J 8/00* | (2006.01) | |
| *B01J 8/08* | (2006.01) | |
| *B01J 8/16* | (2006.01) | |
| *B01J 15/00* | (2006.01) | |
| *C01B 33/037* | (2006.01) | |
| C01B 33/025 | (2006.01) | |
| C01B 33/03 | (2006.01) | |

(52) U.S. Cl.
CPC ............ *B01J 15/00* (2013.01); *C01B 33/027* (2013.01); *C01B 33/037* (2013.01); C01B 33/025 (2013.01); C01B 33/03 (2013.01); Y02P 20/129 (2015.11)

(56) References Cited

U.S. PATENT DOCUMENTS

| | | |
|---|---|---|
| 3,020,129 A | 2/1962 | Herrick et al. |
| 3,647,377 A | 3/1972 | Hilgers et al. |
| 3,963,838 A | 6/1976 | Setty et al. |
| 3,993,450 A | 11/1976 | Schora, Jr. et al. |
| 4,084,024 A | 4/1978 | Schumacher |
| 4,154,870 A | 5/1979 | Wakefield |
| 4,170,667 A | 10/1979 | Rodgers |
| 4,176,710 A | 12/1979 | Gansauge et al. |
| 4,207,360 A | 6/1980 | Padovani |
| 4,213,937 A | 7/1980 | Padovani et al. |
| 4,289,572 A | 9/1981 | Sawyer et al. |
| 4,292,344 A | 9/1981 | McHale |
| 4,298,423 A | 11/1981 | Lindmayer |
| 4,314,525 A | 2/1982 | Hsu et al. |
| 4,318,942 A | 3/1982 | Woerner et al. |
| 4,321,246 A | 3/1982 | Sarma et al. |
| 4,341,749 A | 7/1982 | Iya et al. |
| 4,354,987 A | 10/1982 | Iya |
| 4,377,564 A | 3/1983 | Dahlberg |
| 4,416,913 A | 11/1983 | Ingle et al. |
| 4,424,199 A | 1/1984 | Iya |
| 4,444,811 A | 4/1984 | Hsu et al. |
| 4,532,090 A | 7/1985 | Dietze et al. |
| 4,642,227 A | 2/1987 | Flagan et al. |
| 4,661,335 A | 4/1987 | Boudot et al. |
| 4,668,493 A | 5/1987 | Levin |
| 4,676,967 A | 6/1987 | Breneman |
| 4,684,513 A | 8/1987 | Iya |
| 4,691,866 A | 9/1987 | Belk |
| 4,748,052 A | 5/1988 | Allen |
| 4,784,840 A | 11/1988 | Gautreaux et al. |
| 4,786,477 A | 11/1988 | Yoon et al. |
| 4,789,596 A | 12/1988 | Allen et al. |
| 4,806,317 A | 2/1989 | Boone et al. |
| 4,818,495 A | 4/1989 | Iya |
| 4,820,587 A | 4/1989 | Gautreaux et al. |
| 4,857,173 A | 8/1989 | Belk |
| 4,868,013 A | 9/1989 | Allen |
| 4,883,687 A | 11/1989 | Gautreaux et al. |
| 4,900,411 A | 2/1990 | Poong et al. |
| 4,904,452 A | 2/1990 | Acharya et al. |
| 4,906,441 A | 3/1990 | Flagella |
| 4,919,913 A | 4/1990 | Kurz et al. |
| 5,059,410 A | 10/1991 | Boone et al. |
| 5,077,028 A | 12/1991 | Age |
| 5,128,116 A | 7/1992 | Forwald et al. |
| 5,139,762 A | 8/1992 | Flagella |
| 5,165,548 A | 11/1992 | Dumler et al. |
| 5,242,671 A | 9/1993 | Allen et al. |
| 5,284,676 A | 2/1994 | Accuntius et al. |
| 5,374,413 A | 12/1994 | Kim et al. |
| 5,382,412 A | 1/1995 | Kim et al. |
| 5,791,493 A | 8/1998 | Meyer |
| 5,798,137 A | 8/1998 | Lord et al. |
| 5,810,934 A | 9/1998 | Lord et al. |
| 5,843,234 A | 12/1998 | Finn et al. |
| 5,866,094 A | 2/1999 | Niikura |
| 6,007,869 A | 12/1999 | Schreieder et al. |
| 6,086,678 A | 7/2000 | Wilson et al. |
| 6,090,360 A | 7/2000 | Herman |
| 6,444,027 B1 | 9/2002 | Yang et al. |
| 6,450,346 B1 | 9/2002 | Boyle et al. |
| 6,454,851 B1 | 9/2002 | Fuerhoff et al. |
| 6,455,395 B1 | 9/2002 | Boyle et al. |
| 6,541,377 B2 | 4/2003 | Kim et al. |
| 6,596,095 B2 | 7/2003 | Ries et al. |
| 6,609,870 B2 | 8/2003 | Williams et al. |
| 6,617,225 B2 | 9/2003 | Boyle et al. |
| 6,629,611 B2 | 10/2003 | Satake et al. |
| 6,652,650 B2 | 11/2003 | Yang et al. |
| 6,827,786 B2 | 12/2004 | Lord |
| 6,849,244 B2 | 2/2005 | Konig et al. |
| 6,861,144 B2 | 3/2005 | Wakamatsu et al. |
| 6,880,263 B2 | 4/2005 | Gasparini et al. |
| 6,887,448 B2 | 5/2005 | Block et al. |
| 6,953,559 B2 | 10/2005 | Mleczko et al. |
| 7,001,579 B2 | 2/2006 | Metzger et al. |
| 7,033,561 B2 | 4/2006 | Kendig et al. |
| 7,323,047 B2 | 1/2008 | Sugawara et al. |
| 7,381,392 B2 | 6/2008 | Enebakk et al. |
| 7,476,364 B2 | 1/2009 | Peng et al. |
| 7,549,600 B2 | 6/2009 | Hesse et al. |
| 7,553,466 B2 | 6/2009 | Herold et al. |
| 7,632,478 B2 | 12/2009 | Poepken et al. |
| 7,708,828 B2 | 5/2010 | Weidhaus et al. |
| 7,736,614 B2 | 6/2010 | Lord |
| 7,771,687 B2 | 8/2010 | Kim et al. |
| 7,790,129 B2 | 9/2010 | Lord |
| 7,927,984 B2 | 4/2011 | Molnar |
| 7,931,883 B2 | 4/2011 | Enebakk et al. |
| 7,935,327 B2 | 5/2011 | Arvidson et al. |
| 7,972,562 B2 | 7/2011 | Kim et al. |
| 7,993,455 B2 | 8/2011 | Nakashima et al. |
| 8,017,024 B2 | 9/2011 | Kim et al. |
| 8,114,352 B2 | 2/2012 | Kim et al. |
| 8,178,051 B2 | 5/2012 | Lord |
| 8,221,593 B2 | 7/2012 | Lang |
| 8,404,206 B2 | 3/2013 | Kulkarni et al. |
| 8,431,032 B2 | 4/2013 | Kim et al. |
| 8,535,614 B2 * | 9/2013 | Chu ................. B01J 8/087 422/199 |
| 8,609,058 B2 | 12/2013 | Arvidson et al. |
| 8,703,087 B2 | 4/2014 | Lord |
| 8,722,141 B2 | 5/2014 | Weidhaus et al. |
| 8,728,574 B2 | 5/2014 | Kulkarni et al. |
| 8,747,757 B2 | 6/2014 | Kim et al. |
| 8,821,827 B2 | 9/2014 | Kim et al. |
| 8,906,313 B2 | 12/2014 | Kulkarni et al. |
| 9,662,625 B2 * | 5/2017 | Chu ................. B01J 8/087 |
| 9,751,066 B2 * | 9/2017 | Chu ................. B01J 8/087 |
| 2002/0102850 A1 | 8/2002 | Kim et al. |
| 2004/0042950 A1 | 3/2004 | Mleczko et al. |
| 2004/0091630 A1 | 5/2004 | Sonnenschein |
| 2006/0086310 A1 | 4/2006 | Egeberg |
| 2006/0105105 A1 | 5/2006 | Ibrahim et al. |
| 2008/0029020 A1 | 2/2008 | Sugawara et al. |
| 2008/0041309 A1 | 2/2008 | Nakashima et al. |
| 2008/0187481 A1 | 8/2008 | Ibrahim et al. |
| 2008/0292525 A1 | 11/2008 | Eriksen et al. |
| 2008/0299015 A1 | 12/2008 | Lord et al. |
| 2009/0324819 A1 | 12/2009 | Kulkarni et al. |
| 2010/0061912 A1 | 3/2010 | Lord |
| 2011/0212011 A1 * | 9/2011 | Chu ................. B01J 8/087 423/348 |
| 2013/0336845 A1 * | 12/2013 | Chu ................. B01J 8/087 422/128 |

(56) References Cited

U.S. PATENT DOCUMENTS

2013/0337186 A1* 12/2013 Chu .................. B01J 8/087
                                                 427/535
2017/0361292 A1* 12/2017 Chu .................. B01J 8/087

FOREIGN PATENT DOCUMENTS

| | | | | |
|---|---|---|---|---|
| JP | 06080412 | A * | 3/1994 | |
| JP | 06127927 | A * | 5/1994 | ........... C01B 33/035 |
| JP | 06191817 | A * | 7/1994 | |

* cited by examiner

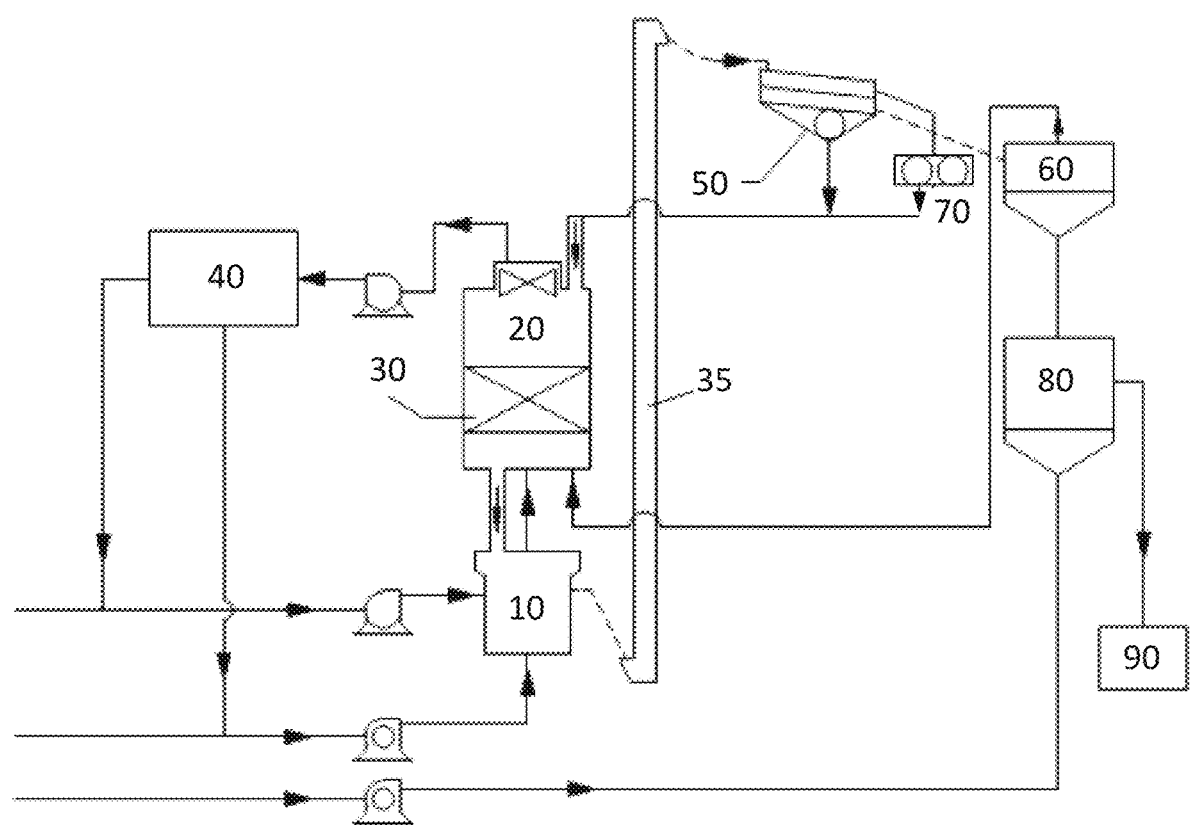
-- FIG. 1 --

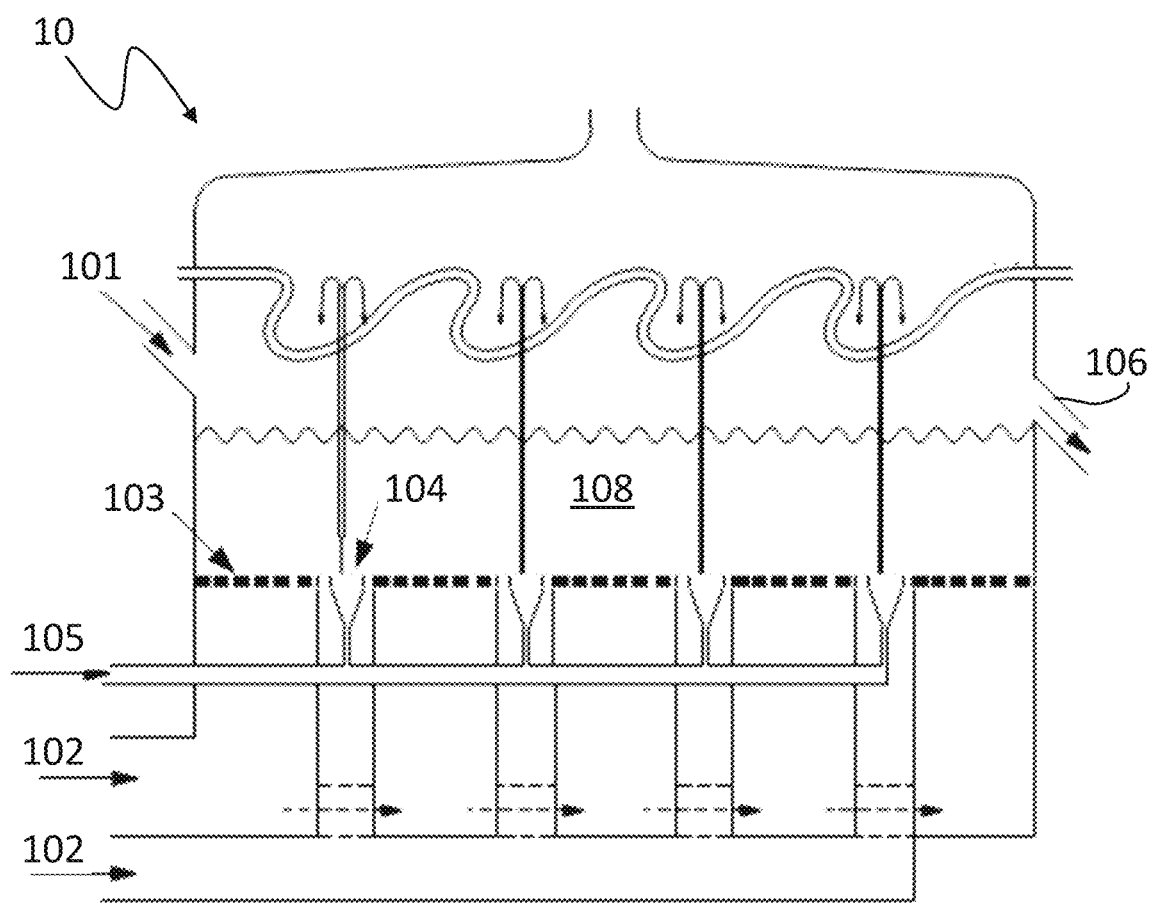
-- FIG. 2 --

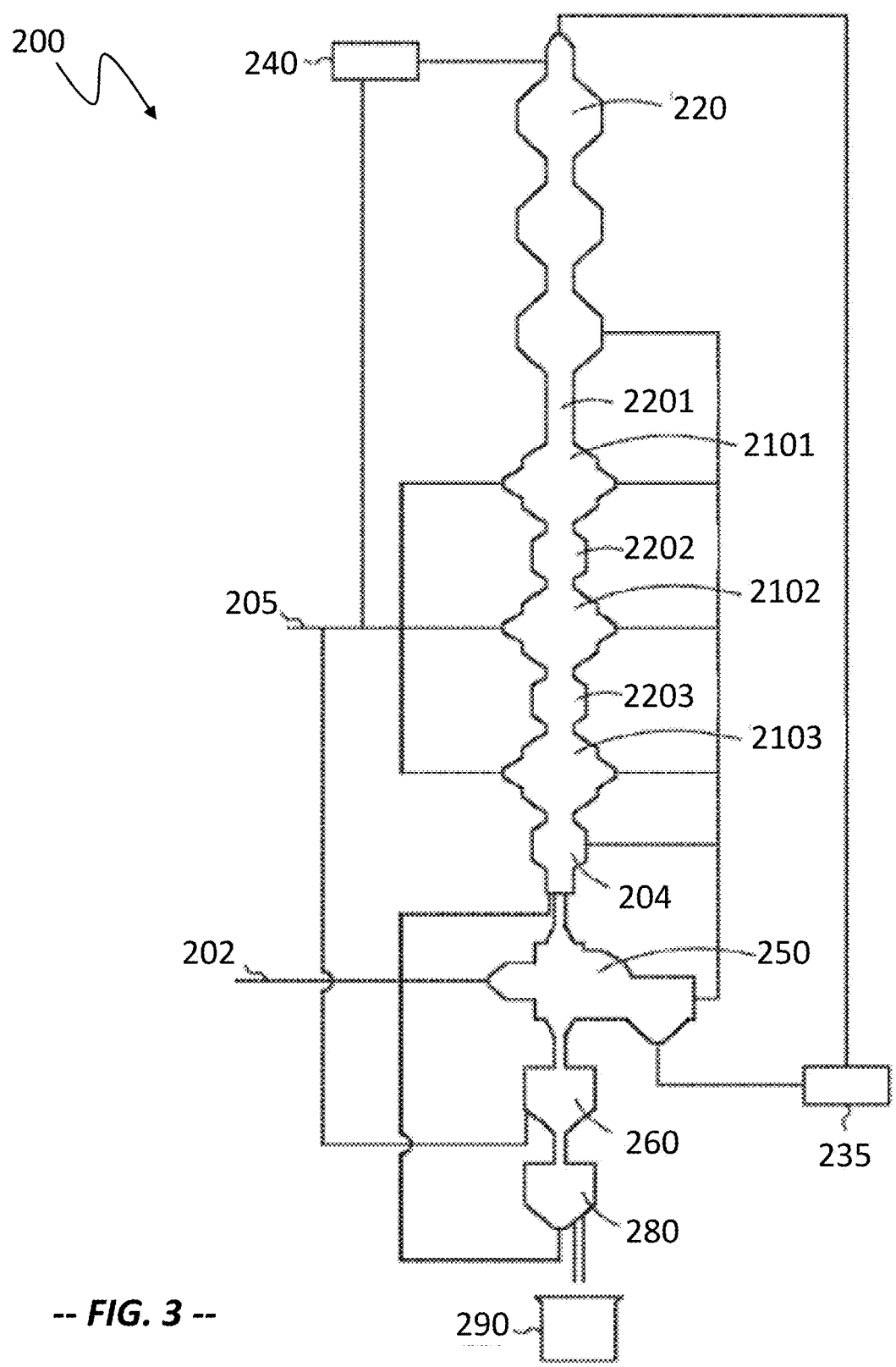
-- FIG. 3 --

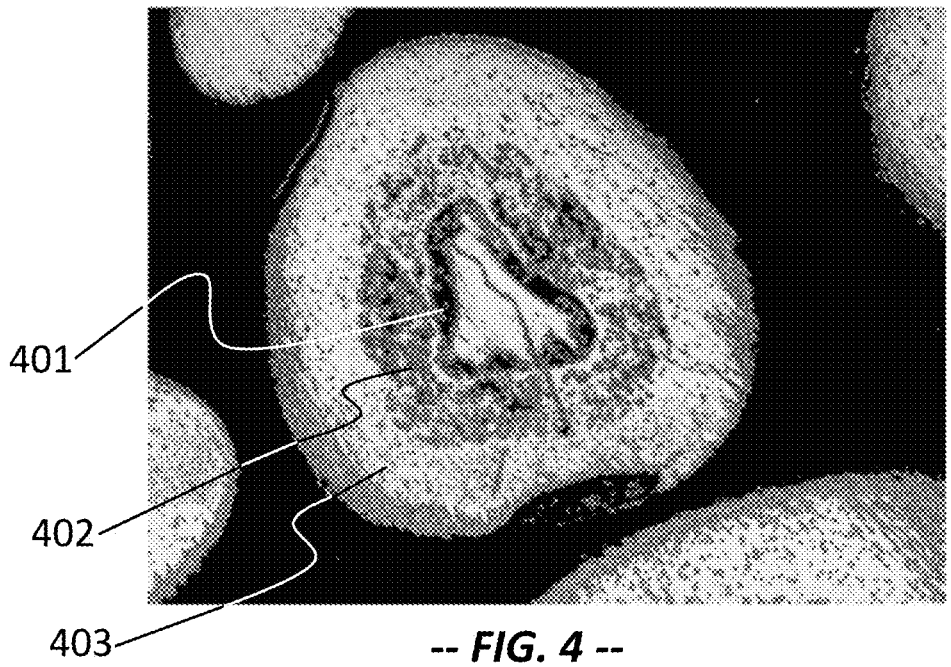
-- FIG. 4 --
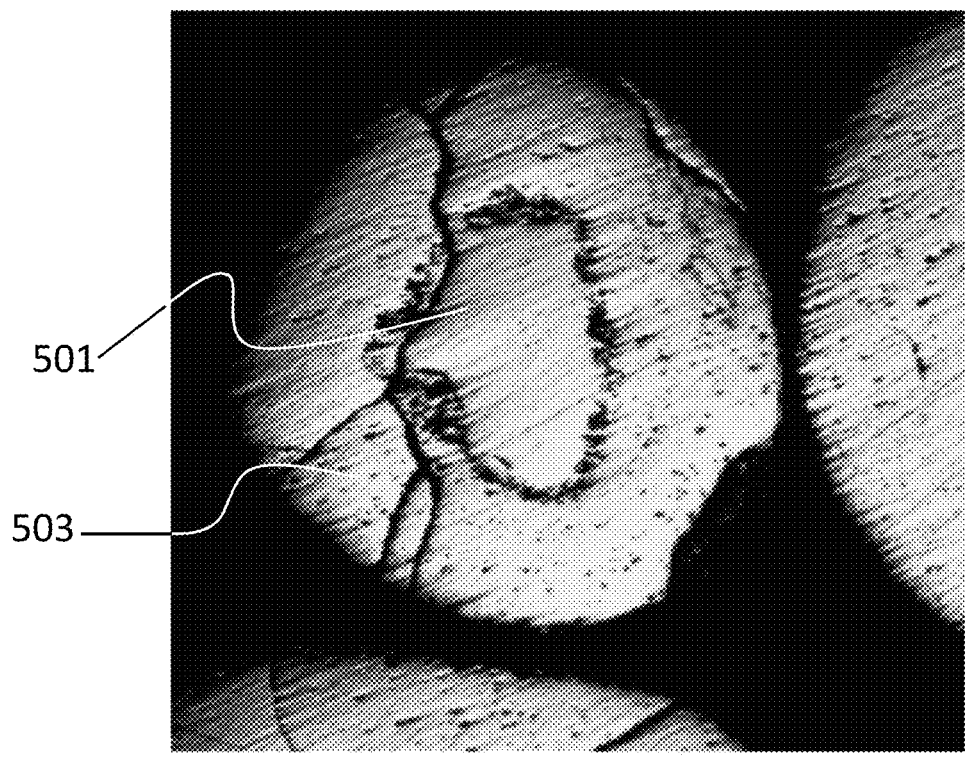
-- FIG. 5 --

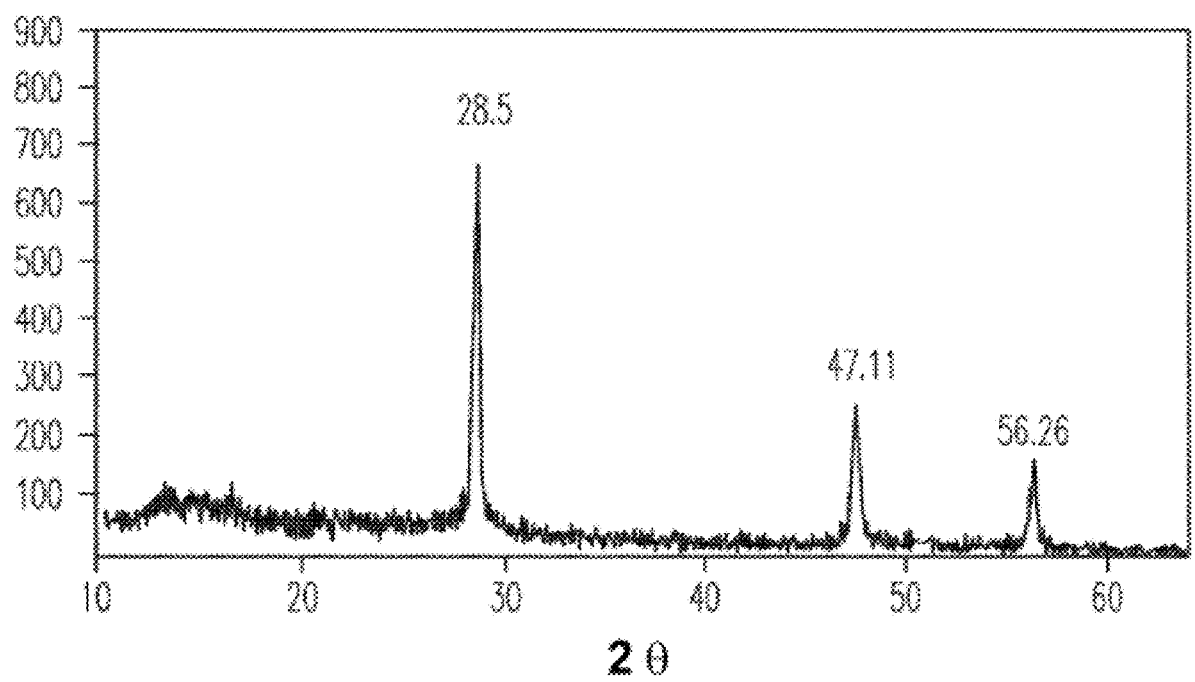
-- FIG. 6 --

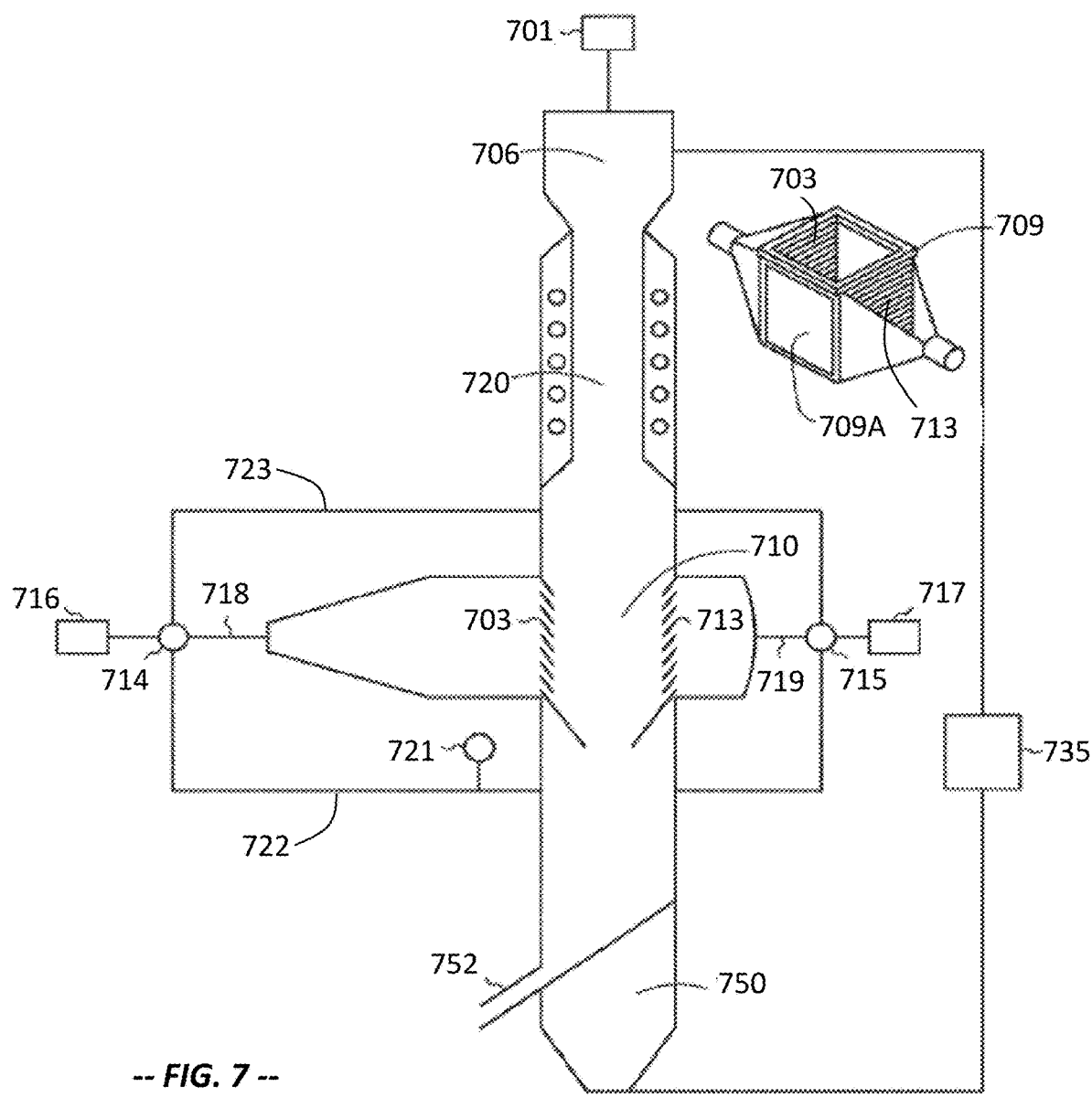
-- FIG. 7 --

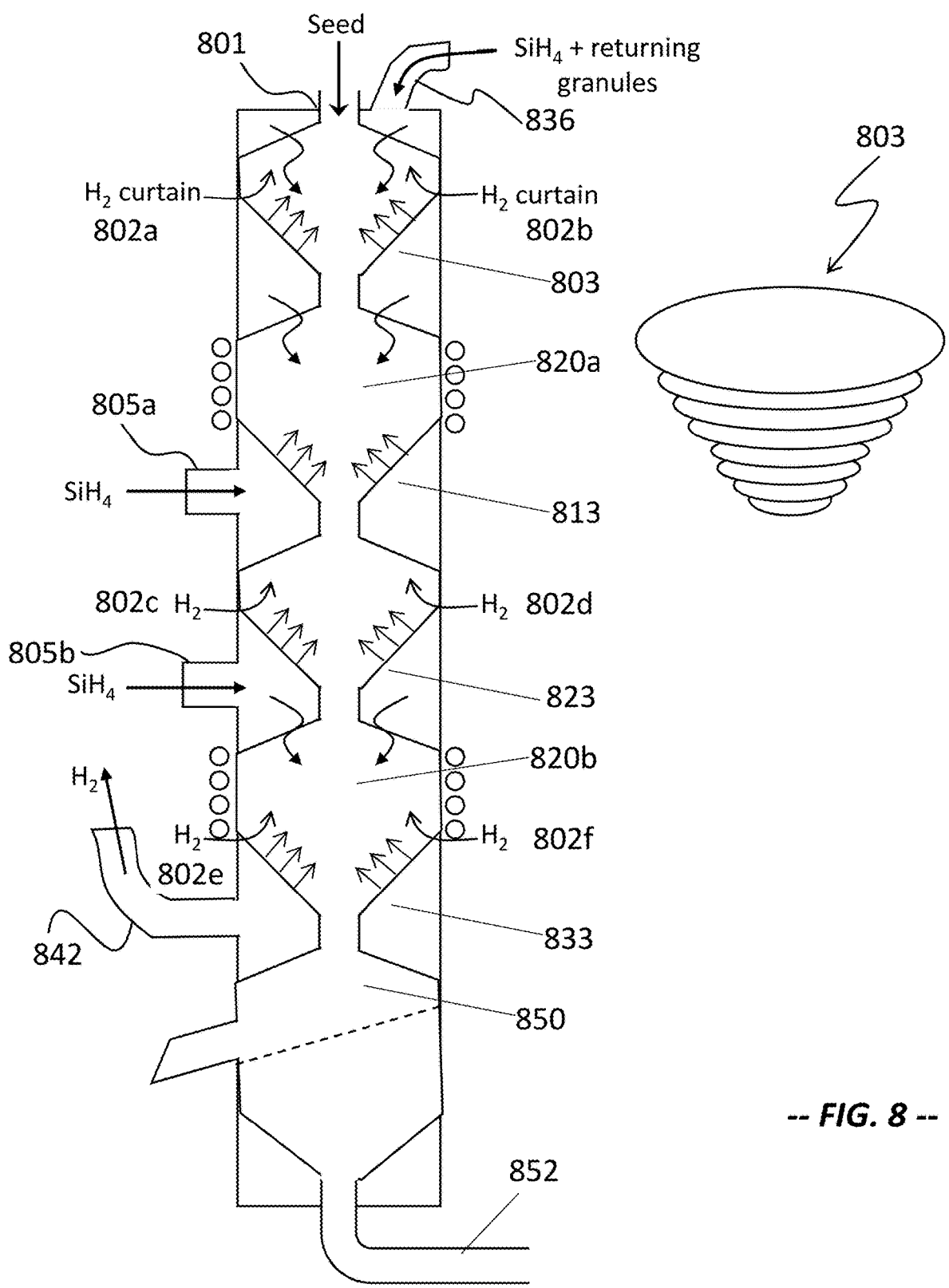
-- FIG. 8 --

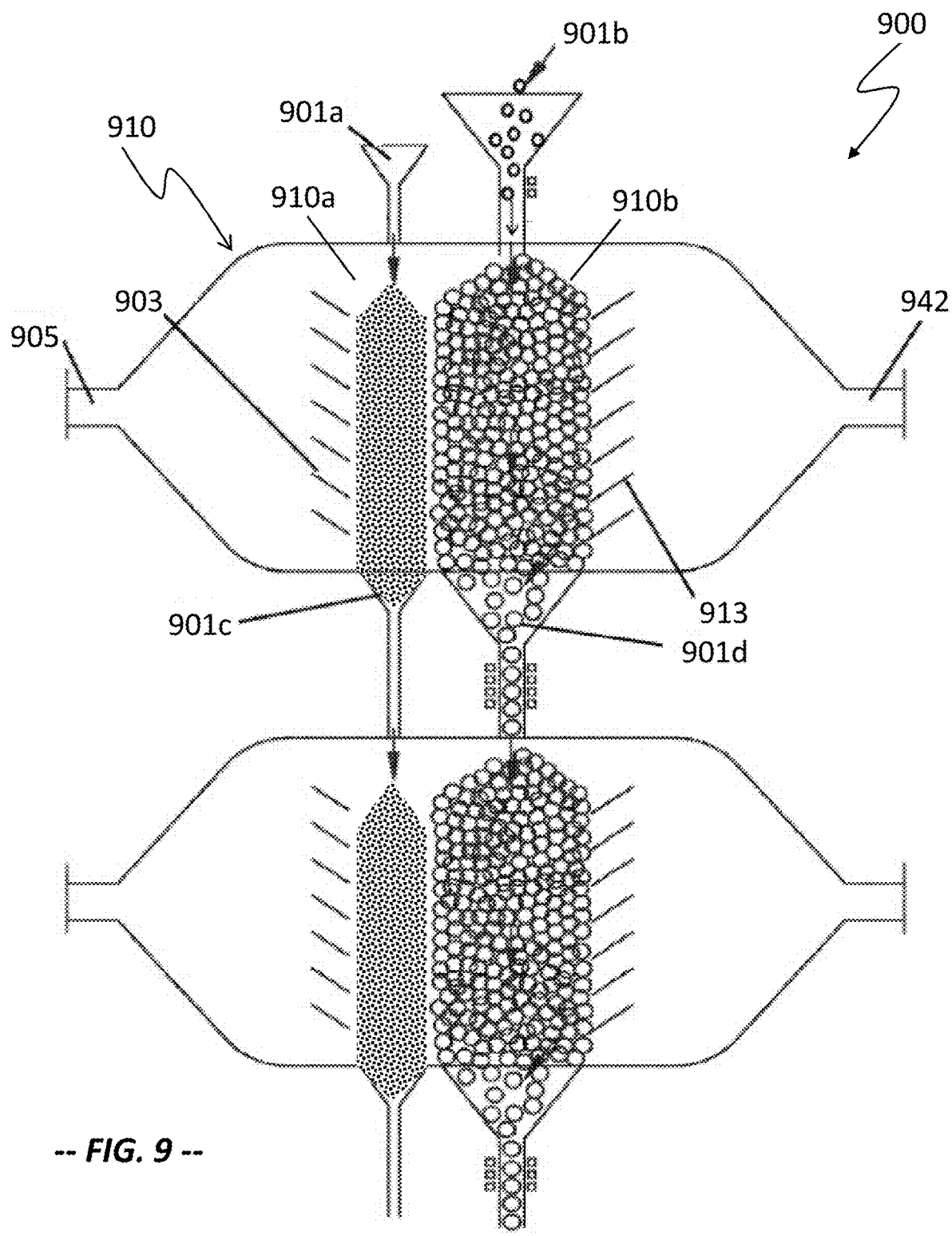
-- FIG. 9 --

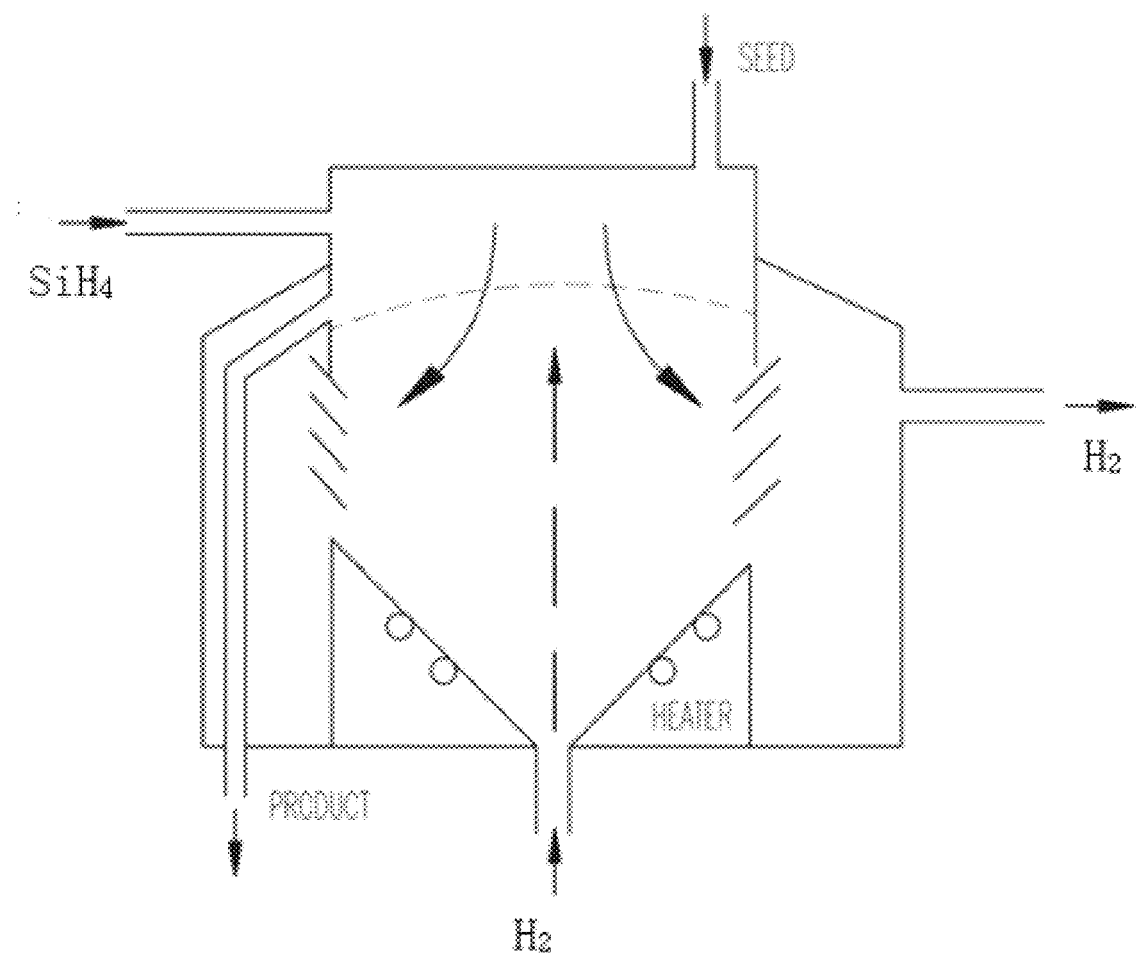
-- FIG. 10 --

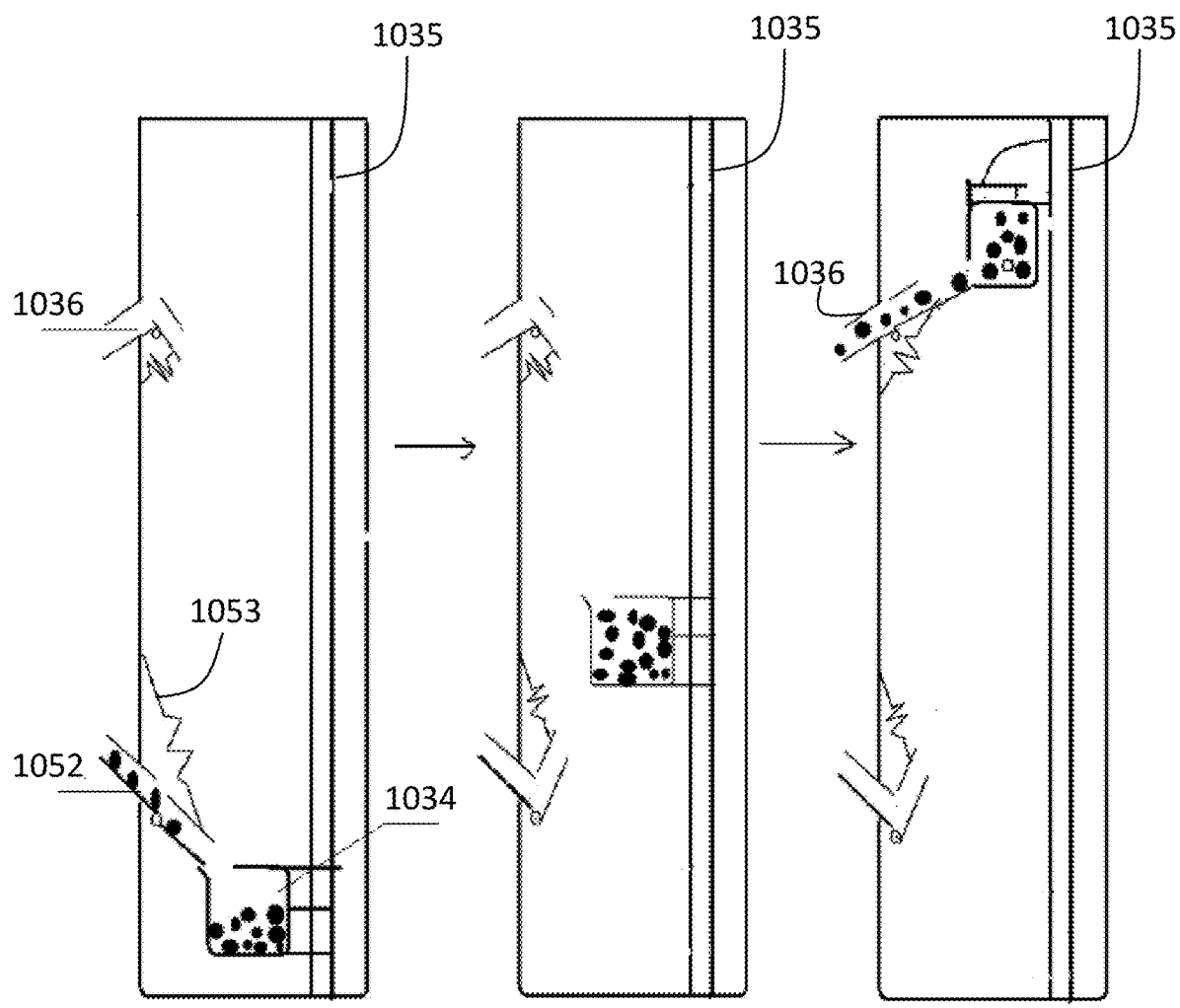
-- FIG. 11 --

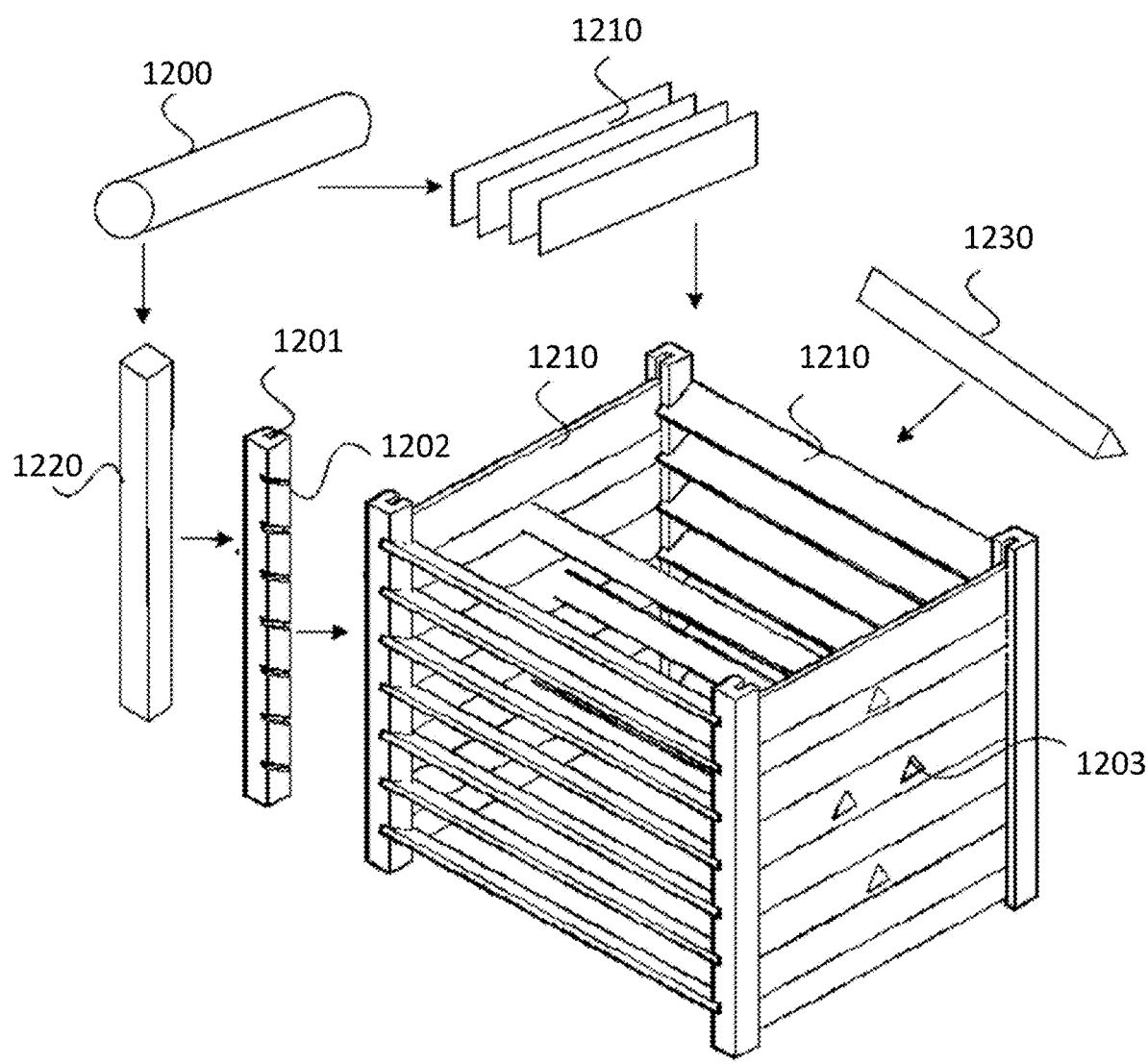
-- FIG. 12 --

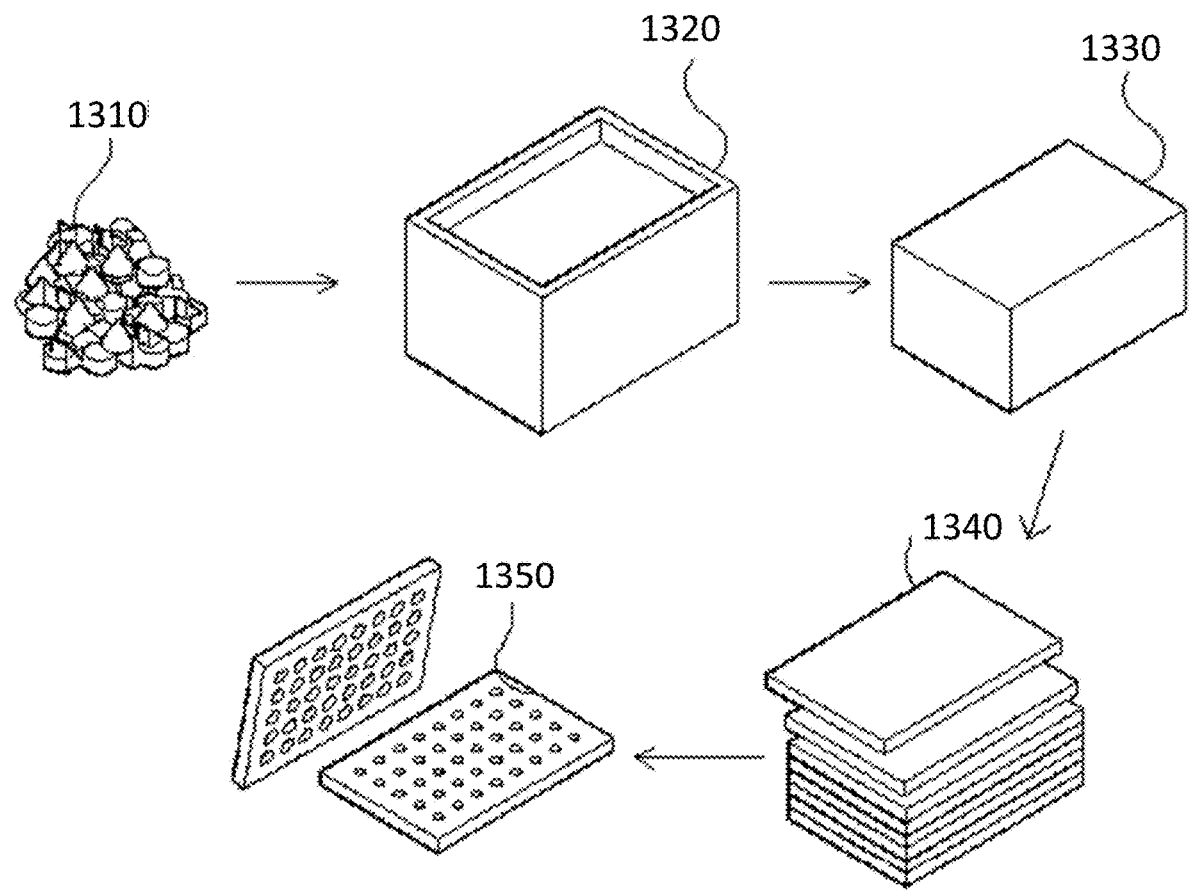
-- FIG. 13 --

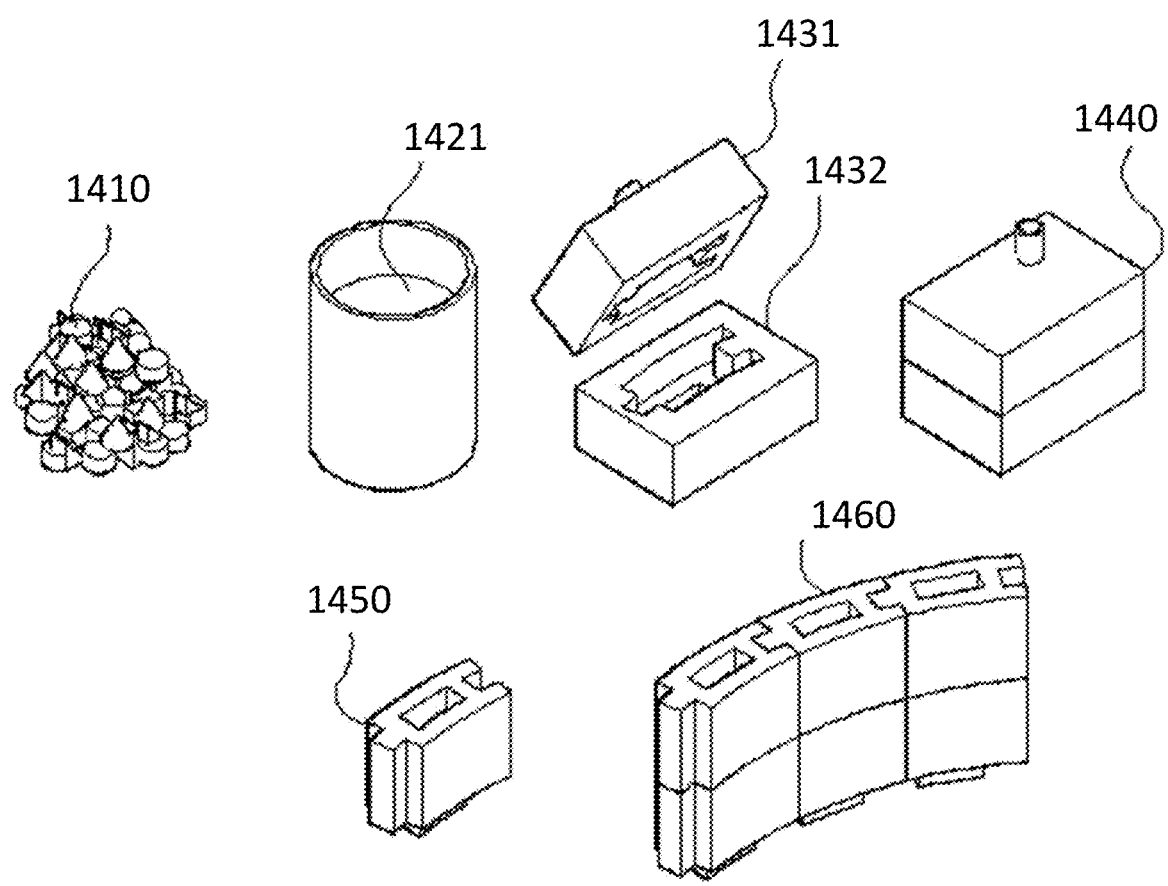
-- FIG. 14 --

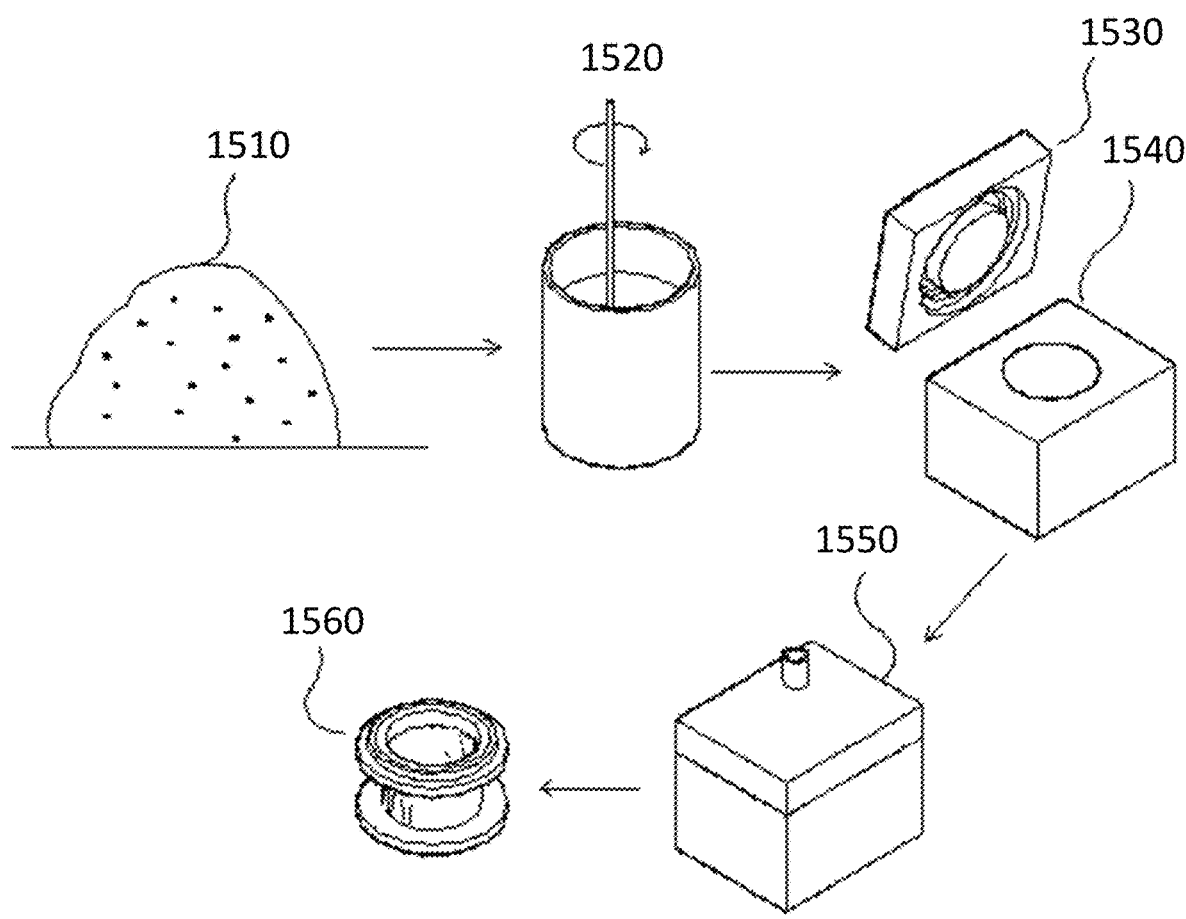
-- FIG. 15 --

SYSTEM FOR PRODUCING HIGH-PURITY GRANULAR SILICON

CROSS-REFERENCE TO RELATED APPLICATIONS

The present application is a continuation application of U.S. patent application Ser. No. 13/969,556, filed Aug. 17, 2013, and granted as U.S. Pat. No. 9,751,066 on Sep. 5, 2017; which is a continuation of U.S. patent application Ser. No. 13/043,155, filed Mar. 8, 2011, and granted as U.S. Pat. No. 8,535,614 on Sep. 17, 2013; the entire contents of each priority application being incorporated by reference herein.

TECHNICAL FIELD

The present invention relates to high purity silicon production technology. In particular, it is directed to reactors and methods for producing high purity granular silicon.

BACKGROUND

In the past, high-purity silicon material was primarily used for the production of semiconductor components. With the development of semiconductor integrated circuit technology, the integrated circuits have become smaller. Thus, even though there are more electronic devices on the market, the consumption of high-purity silicon has not been significantly increased.

However, the demand for high purity silicon has grown significantly in the solar photovoltaic industry in recent years, as the high purity silicon is also an important raw material of solar photovoltaic cells. The demand in the solar photovoltaic industry has now exceeded the demand in the semiconductor industry. Because the profit margins for solar photovoltaic industry are very small, it is imperative to reduce the cost of high-purity silicon material production. The high cost has made the traditional methods of production a great challenge.

Traditional methods of producing high purity silicon include the Siemens method and the fluidized bed method. The Siemens method includes a process of introducing a mixture of purified silicon-containing gases, such as trichlorosilane ($SiHCl_3$) or silane ($SiH_4$), and hydrogen gas into a reactor, inducing a thermal decomposition reaction on the surface of a hot mandrel, continuously thickening the high purity silicon by deposition of silicon on the hot mandrel surface, and returning the exhaust gas into the treatment system for separation and recycling. When the diameter of the silicon mandrel grows to a certain point, the reaction is terminated, and the silicon mandrel is replaced for the next round of reaction. The process involves intermittent operation and requires high energy consumption. One kilogram of high-purity silicon consumes 150 kwh on average or even higher. In addition, there are other disadvantages such as low efficiency. The production of high purity silicon by the Siemens method leads to low yield and high cost, and it will not meet the growing needs from the solar industry.

The fluidized bed process includes heating high purity granular silicon seeds in a reactor, introducing high-purity silicon-containing gas into the reactor, and inducing thermal decomposition on the surfaces of the seeds, so that high purity granular silicon grows bigger and bigger and precipitates in a collection box. As the fluidized bed process uses a large quantity of high purity granular silicon seed, the entire surface area is relatively large compared to Siemens method. The reaction efficiency and conversion efficiency are greater than for the Siemens process; and the power consumption is also reduced. Nevertheless, certain issues remain with the conventional fluidized bed method including the following:

1. High purity silicon granules formed in the suspended state separate from each other forming more than 80% free-space. Consequently, large amounts of silicon fine powders are formed from the decomposition of silicon-containing gas and are taken away with the reactor exhaust gas, therefore reducing the raw material (gas) usage and increasing costs. Additionally, the fine silicon powders increase the difficulty of the treatment of the exhaust gas as well as the cost of equipment as the silicon powder enters the downstream process. The fine silicon powders also cause pollution.

2. In a fluidized bed reactor, suspending silicon particles, especially large sized particles, consumes a large amount of gas in the reactor that results in the difficulty of gas recovery. In addition, it leads to low utilization of reaction heat and increased operating costs.

3. The surface of the silicon granules is in a semi-molten state under the reaction temperature (200° C. to 1400° C.). Due to the adhesion between particles, the semi-molten state causes inter-particle agglomeration. Consequently, the reactor distributor pores, pipes, and channels are easily plugged and result in cut-off incidents.

4. The cost of equipment is high, and the construction of equipment is difficult, due to the large reactor volume required and the less effective use of space. Only small-scale production is practical in operation.

5. The preparation of high purity granular silicon seeds is difficult as the seeds can be easily contaminated during the preparation.

SUMMARY

The present disclosure is directed to reactors and methods for the production of high purity granular silicon. The reactors and methods disclosed herein can be used to achieve large scale, efficient, energy-saving, continuous, and low-cost production of high purity silicon granules.

The disclosure provides a reactor for the production of high purity granular silicon particles, including: a solid feeding port, an auxiliary gas inlet, a raw material gas inlet, and an exhaust export installed on the reactor chamber; a gas distributor, used for the dispersion of auxiliary gas and raw materials gas installed in the reactor chamber; an internal or external preheating unit installed in the reactor chamber; and an exhaust gas processing unit installed outside the reactor chamber connecting the preheating units and inlets for the auxiliary gas and raw material gas; and a surface finishing unit connected internally with or externally to the reactor chamber.

The surface finishing unit is used for the surface treatment of the high purity silicon granules. The reactor chamber is equipped with an internal or external heating mechanism and dynamics generating units. The dynamics generating units are used to create relative motion between high purity granular silicon in the high purity granular silicon bed layer inside of the reaction chamber to avoid sintering.

The reactor chamber is equipped with a sieving unit and a seed generating unit. The sieving unit sorts silicon granules with desirable size, and the seed generating unit breaks some large granules into small ones and adds them into the reactor chamber to provide new surfaces for silicon deposition.

The present disclosure also provides a method of producing high purity granular silicon particles, including: forming a high purity granular silicon bed layer with densely packed (stacked) high purity granular silicon, with a fill rate greater than 10%; heating the high purity granular silicon bed to a temperature in a range of 100° C. to 1400° C., wherein the high purity granular silicon particles are in relative motion inside the high purity granular bed layers; introducing auxiliary gas and raw material gas, wherein the auxiliary gas is high-purity $H_2$ gas and/or other inert gas (such as Ar and He), and the raw material gas is the silicon-containing gas and, optionally, reducing gas $H_2$.

Following the heat exchange of the exhaust gas of the reaction with supplemental high purity granular silicon, the exhaust gas components are separated and recycled into the reaction chamber through the inlet of auxiliary gas or the raw material gas. The supplemental high purity granular silicon is introduced into the reactor for further deposition on the granule surfaces. During the operation, large granules are removed from the reactor, and smaller "seeds" are added into the reactor to balance the total surface area for silicon deposition.

After treating the surface of high purity granular silicon particles, the particles are then collected for packaging after cooling.

The present disclosure provides a reactor and a method for producing high purity silicon granules. The use of a densely stacked high purity granular silicon bed layer in relative motion prevents the adhesion between the granular silicon and therefore reduces the volume of the reactor. The densely stacked high purity granular silicon bed also captures fine high purity silicon as seeds for further deposition. It also utilizes the reaction heat from exhaust gas for the heating of supplemental granular silicon. Therefore, the method can achieve large scale, efficient, energy saving, continuous, and low-cost production of high purity granular silicon.

BRIEF DESCRIPTION OF DRAWINGS

FIG. 1 is a schematic view of a reactor for the production of high purity granular silicon.

FIG. 2 shows a schematic view of an exemplary reaction chamber for the production of high purity granular silicon.

FIG. 3 shows a schematic view of an example of a vertical multistage reactor diagram of a reaction system for the production of high purity granular silicon.

FIGS. 4 and 5 are optical micrographs showing a cross-sectional view of the high purity silicon granules produced by the claimed invention.

FIG. 6 shows a view of X-ray diffraction patterns of the high purity silicon granules produced by the claimed invention.

FIG. 7 shows a reactor system for granular polysilicon using silicon trichloride silane.

FIG. 8 shows a reactor system for silane decomposition to form granular polysilicon.

FIG. 9 is a schematic view of a reactor system for silane decomposition to form granular polysilicon.

FIG. 10 shows a schematic view of a submerged bed reactor for silane decomposition into granular polysilicon.

FIG. 11 shows a system for mechanical transport of silicon granules.

FIG. 12 is a schematic view of manufacturing a square double-shutter reactor chamber from single crystal ingot or polysilicon bar for granular polysilicon.

FIG. 13 shows a schematic view of manufacturing a high purity polysilicon screen from single crystal slabs or polysilicon bar for sieving granular polysilicon.

FIG. 14 shows a schematic view of casting high purity polysilicon blocks for the construction of a large diameter reactor liner.

FIG. 15 shows a schematic view of making complex components in silicon transport system components by casting using high purity silicon powder and sintering afterwards.

DETAILED DESCRIPTION

Detailed description and implementation of the present invention is further described in combination with the drawings and examples.

Examples of reactors for producing high purity silicon particle are provided in FIGS. 1 and 2. FIG. 1 illustrates a schematic diagram of a reactor for the production of high purity granular silicon; and FIG. 2 shows an exemplary diagram of a reaction chamber for the production of high purity granular silicon. As shown in FIG. 1 and FIG. 2, the device includes a reactor chamber 10, a preheating unit 20, an exhaust gas processing unit 40, a surface finishing unit 60, a heating unit, and a dynamics generating unit.

The shape of the reactor chamber 10 can be square, cylindrical, rectangular or other shapes; it can be layered or segmented. The reactor chamber 10 can be set upright (vertically), tilted, or flat (horizontally), wherein co-flow (or, co-current, gas and solid are in the same direction) or anti-flow (gas and solid travel in the opposite directions) or cross-flow (the gas travels at any angle between 0 and 180 degrees with respect to the solid flow) operations can be applied during operation. When the reactor chamber is placed upright or tilted, the height of the reactor chamber is about 1-100 meters, preferably 1-50 meters.

For example, when the height of reactor chamber 10 is 1 meter, the reactor can be one or multi-levels. The height of each level is at least 10-20 cm. When the height of reactor chamber 10 is 50 meters, the reactor 10 can be one or multiple levels. The height of each level can be different. If it is a multi-level reactor, the height of each level is at least 10-20 cm.

The height of the reactor 10 can be fixed, for example, at 50 meters. The height of each level can be set according to reaction levels. If the reactor is one level, the height can be set for 50 meters. If the reactor is five levels, each level can be 10 meters high. Similarly, when the height of the reactor chamber 10 is 70 meters or 100 meters, the reactor 10 can also be one level or multiple levels. The height of each level can be set according to the required reaction levels. It can also be set with the proportion of a small size reactor (such as reactor chamber height of 1 meter or 50 meters). It can also be stacked with multiple small-size reactors. The size of the reaction chamber 10 can be determined by the actual condition of the reaction with the goal of making the reaction gas most efficient in conversion and energy saving when the gas is introduced through the reaction bed.

The present invention is not limited to the height of the reactor chamber 10. For example, the height of the reaction chamber 10 can be 1-1000 meters. When the reactor chamber 10 is flat, then the length of the reaction chamber 10 can be 1-100 meters, preferably 1-50 meters. The length of the reactor chamber 10 is therefore similarly described to the height of the reaction chamber 10. However, multiple reactor chambers can be stacked horizontally in two dimensions and three dimensions over each other.

The reaction of high purity silicon production is an endothermic reaction. To ensure no heat loss or minimum heat loss, the shell of reactor chamber 10 can be composed of three layers. The inner liner is heat resistant material; the middle layer is heat resistant fiber and slag wool or other insulation material; and the outermost layer can be steel as support.

As shown in FIG. 2, the reaction chamber 10 is equipped with a solid feeding port 101, which is used to introduce high purity granular silicon seed to the reaction chamber 10.

The reaction chamber 10 is also equipped with an auxiliary gas inlet 102, a raw material gas inlet 105, and an exhaust gas export 106. Auxiliary gas can be high purity reducing gas $H_2$ and/or other inert gas (such as Ar or He). Raw material gas can be high purity silicon-containing gas or high purity silicon-containing gases with reducing gas $H_2$. The silicon-containing gas can be selected from $SiH_4$, $SiHCl_3$, $SiCl_4$, $SiH_2Cl_2$, and $SiBr_4$, etc. The purity of the gas used in the present invention (including raw materials gas and auxiliary gas) is above 99.99%. The composition of the silicon-containing gas is 1% to 100% in the raw material gases.

The auxiliary gas inlet 102 leads to the gas distributor 103 in the reaction chamber 10. The raw material gas inlet 105 leads to a raw material gas nozzle 104. Auxiliary gas and raw material gas are dispersed through the gas distributor 103 of the raw material gas nozzle 104 in the reaction chamber 10. High purity granular silicon seeds are densely packed in the gas distributor 103 through the solid feeding port 101. (Alternately, the high purity granular silicon bed does not have to be accumulated in the gas distributor. It can rely on chamber diameter and material circulation rate to control the residence time of materials in the reaction chamber.)

The particle size distribution of high purity silicon seeds can overlap with high purity silicon product granules. That is, the particle size of a portion of high purity silicon seeds can be greater than or equal to the high purity silicon granules produced. Preferably, the particle size of high purity silicon seeds is 10%-30% of those of the high purity silicon granules produced. The granule size varies based on the application of different circumstances, usually in the 1-20 mm range.

More specifically, the gas distributor 103 is composed of a flower-shaped porous plate (or sieve) and a hood component. It can also be one single flower-shaped plate (porous sieve) without the hood. The gas distributor 103 can be co-flow, cross-flow (shutter-like), close holes, or a silicon granule-filled distributor. Due to the intensive accumulation of the high purity granular silicon in a high purity granular silicon bed 108, the volume of the reactor is relatively small in the present invention. Compared with the existing fluidized bed technology, it can reduce the volume of the reactor and increase production.

The preheating unit 20 is equipped internally or externally of the reaction chamber 10. As shown in FIG. 1, the preheating unit 20 is installed externally of the reactor chamber 10. The solid feeding port is installed with the preheating unit 20, and it is used to supplement high purity silicon seed material, since the invention requires consumption of seed during the production of high purity silicon granules and therefore the need to constantly supplement the seed of high purity granular silicon. Reaction exhaust gas passes through the preheating unit 20 to provide heating for the high purity silicon seeds.

The exhaust gas processing unit 40 is installed externally of the reaction chamber 10, and it is connected between the preheating unit 20, the auxiliary gas inlet 102, and the raw material inlet 105. The exhaust gas passes through the preheating unit 20 and enters into the gas processing unit 40. The components of the exhaust gas are separated in the exhaust processing unit 40. The isolated gas is then recycled to the reaction chamber 10 through the auxiliary gas inlet 102 or the raw material gas inlet 105.

Reaction exhaust gas may carry high purity silicon powder because of the following reasons: 1) high purity silicon granules and/or particles in the high purity granular silicon bed layer are in a disturbance and lead to particle abrasion during the process; and 2) silicon-containing gas can produce silicon powder itself due to pyrolysis. The condensed high purity silicon particle bed layer 108 in the reactor 10 can capture silicon powder from the exhaust gas, thus playing a role as a dust removal device and allowing the exhaust gas to be recycled into the reaction chamber 10 after passing through the preheating unit 20 and the exhaust gas processing unit 40.

The surface finishing unit 60 is installed internally or externally on the reactor chamber 10. It is used to treat the surface of high purity granular silicon. The surface of high purity silicon granules tends to be loose and easy to produce dust, which will affect the downstream applications. It is therefore necessary to treat the surface of the high purity silicon granule to make it more compact. The surface finishing unit 60 preferably contains 0-10% of the low concentration reaction gas in the reaction chamber 10. It can be a number of sections in the reactor. With reaction gas in a low concentration (0-10%) in gas spouted beds, the surface of high purity silicon granules can form dense surface structure of silicon, so as to achieve the surface treatment. This method can avoid impurities and other treatment processes, thus reducing production costs. Of course, the surface treatment process can also use the traditional pickling, cleaning, and drying process.

The preheating unit 20 is installed internally or externally on the reactor chamber 10. Reactants are heated in order to achieve the reaction temperature. The preheating unit 20 is preferably selected from electrical connection of the power supply with high granular silicon bed layer 108, i.e., the bed layer of high purity granular silicon is applied with voltage. Due to the semiconductor properties of silicon, the high purity granular silicon bed layer 108 is heated, and the temperature is increased. Such method provides direct heating, high thermal efficiency, and high utilization efficiency. It can also help to prevent pollution and ensure the purity of the product.

The preheating unit 20 can also be many other existing heating technologies including: 1) direct heating using resistance wire (silicon ingots, high purity SiC, high purity SiN, or high purity graphite and other materials); 2) indirect heating by microwave, plasma, laser, or induction and other methods; 3) indirect heat radiation from a rotary kiln or the flame across the combustion tube, which can provide heating; 4) using an outer jacket and an internal bed heat exchanger, in which the heat exchanger can be used outside the jacket and the heat carrier heating inductor converter; bed heat transfer can be by heat induction, electrical induction, and electrode heating, etc.; 5) external heating methods, such as may occur when the reactants required in the reaction (e.g., suspended gas and silicon particles itself) are heated externally before being introduced into the reactor; 6) dual-formed reaction heat (coupling-reaction heating) by chemical reaction, such as may occur when chlorine ($Cl_2$) or hydrogen chloride (HCl) are added to the system.

In order to prevent the adhesion of high purity silicon granules in the production, the present invention includes a dynamics generating unit, which creates relative motion for the high purity granular silicon in the high purity granular silicon bed layer 108. The dynamics generating unit is installed internally or externally on the reactor chamber 10. Preferably, the dynamics (motion) generating unit is the auxiliary gas nozzle and/or the raw material gas nozzle 104. The auxiliary gas nozzle and raw material gas nozzle 104 are installed inside the reactor chamber 10, and they are connected with the auxiliary gas inlet 102 and the raw material gas inlet 105, respectively. The auxiliary gas nozzles and the raw material gas nozzles 104 are used to inject auxiliary gas and raw material gas into the reaction chamber 10 and to stir the high purity granular silicon bed layer 108 to induce high purity granular silicon into a state of relative motion, thereby avoiding the adhesion between high purity granular silicon by acting as a gas-solid blender. As the raw material gas is injected directly into high purity granular silicon bed 108, it results in less susceptible reaction with high purity granular silicon seed as the silicon seed is near the gas distributor 103. Consequently, the gas distributor 103 is less likely to be plugged.

The dynamics generating unit can also facilitate the relative motion of the high purity granular silicon bed 108 in the following ways: 1) introducing external forces, such as spraying, turning, stirring, mixing, vibration, or making the high purity granular silicon bed flow under gravity through staggered wall comb structure; 2) subjecting the reactor to the other gravitational field (such as centrifugal force field, etc.); 3) the use of an agitation bed; and 4) the use of a special bed (including mechanical vibration, acoustic or ultrasonic vibration, vibrators, etc.).

Furthermore, in order to better capture the high purity silicon powder in the reaction exhaust gas and to supplement high purity granular silicon seed, the present invention also includes a gas-solid separation unit 30 in fluid communication with the reaction chamber 10.

The gas-solid separation unit 30 is installed internally or externally of the reaction chamber 10, and it is connected with the preheating unit 20. The reaction exhaust gas from the reaction chamber 10 is discharged by the gas-solid separation unit 30 to capture high-purity silicon powder. The high purity silicon powder is then returned to the reaction chamber 10 as seeds in the reaction or kneaded with other silicon particles.

Preferably, the gas-solid separating unit 30 is a densely packed high purity granular silicon bed layer (with a fill rate greater than 50%, and preferably from 50-80%). For example, the high purity granular silicon particles can also be densely stacked within multiple silicon tubes (or ceramic tube) with pores. The silicon tubes can be covered with quartz glass fabrics externally; and they can be suspended in an array onto an expanded section at the top of the reaction chamber or outside the chamber.

Reaction exhaust gas is introduced into separation unit 30 with a dense layer of high purity granular silicon particles. The high purity silicon powder can then be captured in the process using the gas-solid separation unit 30. Not only does it prevent the drifting of high purity silicon powder into the reaction downstream, but also it creates a simple and a clean production of high purity granular silicon seed. In such process, the filling ratio is the ratio of space taken by high purity granular silicon particles and its fill space. Filling rate is dependent on particle shape and particle size distribution. Filling rate is not specific to the entire reaction chamber. For example, when the filling ratio is 70%, the reaction chamber can be filled only by 20%.

Of course, the gas-solid separation unit 30 can also use other forms to achieve the same effect, such as: 1) by changing the internal diameter of the reactor and enlarging the top section of the reactor to alter the escape velocity of small particles and collection of the particles by sedimentation; 2) the use of a cyclone separation unit; or 3) the use of a filter or a dust collector.

In order to produce uniform particle size of the high purity silicon granules, the reactor of this invention may also include a particle screening unit 50. The screening unit 50 is installed internally or externally on the reaction chamber 10; it is connected between the reactor chamber 10 and the surface finishing unit 60. The high purity silicon granules are imported into the screening unit 50. Large granules are ground (via a pulverization unit 70) and are then sent to the preheating unit 20 with small particles. The silicon particles continue to grow in the reaction chamber 10. The desired particle size of high purity silicon granules is selected, and the appropriately sized granules are sent into the next processing steps. The resulting particle size of the product can be controlled at the optimum range. Not only does the present process reduce the possibility of surface contamination (granules tend to be contaminated due to their larger surface area), but also it is advantageous for the downstream application. In the process of screening and recycling, it is desirable to avoid direct contact between high-purity silicon particles and other non-silicon materials, especially metal, in order to prevent pollution and to maintain the quality of the product.

In order to provide other methods to add high purity granular silicon seed, the reactor of this invention can also include the pulverization unit 70. The pulverization unit 70 is connected between the particle screening unit 50 and the preheating unit 20. It is used for the grinding process for the portion of the large particles separated from the screening unit 50.

The high purity granular silicon seed is in a constant consumption during the production process. When high purity silicon powder separated out by gas-solid separating unit 30 in the reactor is not sufficient for the consumption of the seed, the ground large particles of high purity silicon through the pulverization unit 70 can be returned to the reaction chamber 10 through the preheating unit 20. Since the particles of high purity silicon produced by the disclosed method contain hydrogen, they can be heated quickly in a vacuum or high purity inert gases, such as Ar, He, and $N_2$, by the pulverization unit 70 to burst formation of small particles into seeds. The pulverization unit 70 can also be a high-speed gas breaker, ultrasonic breaker, or dust collector (cyclone, baghouse), etc.

In order to reduce the deposition of silicon particles on the wall of the reaction chamber 10, the reaction chamber 10 can also include a gas curtain unit (through or not through the wall) tangential to the inner wall of the reaction chamber 10. The unit is used as a gas curtain to cover the wall of reaction chamber 10. Specifically, the gas curtain may include a ventilation port that is cut into multiple strips with small angles with the inner surface of the wall of the reaction chamber 10. The strips of the ventilation port can be horizontal or vertical. The non-silicon-containing gas (inert gas) is introduced externally into the reaction chamber 10, and it can create a gas curtain tangential to the inner surface of the chamber wall in the reaction chamber 10. The gas curtain can prevent the deposition of silicon particles from the silicon-containing gas on the wall of the reactor chamber 10.

The gas curtain can also be a circular tube connecting the bottom or top section of the reaction chamber 10 and the external non-silicon gas (inert gas) pipe. The circular tube contains multiple strips that are parallel to the wall of the reaction chamber 10. When the non-silicon-containing gas is introduced through circular tube, it forms a gas cover between the reaction chamber wall and the inner surface of the wall. The gas curtain can prevent the deposition of silicon particles from the silicon-containing gas on the reactor wall.

The present invention can also include a solid recirculation system coupled with a monitoring and central control system. Every step of the process can be recorded with specific process parameters. When specific process parameters exceed the normal range, the control system will issue a warning and the system will be automatically adjusted. The required parameters for the process include: bed temperature (including gas and solid temperature), the export gas (reaction exhaust gas) composition, pressure, solid particle size, bed density, heat and mass transfer, and the circulation of solid particles.

The reaction chamber 10 and the heating unit 20 of the present invention can be horizontal or vertical with multi-level (stage) and multi-dimensional structure (see FIG. 2, the gas nozzle can be multiple and set in a two-dimensional array). The number of reaction levels can be from 1 to 50, preferably from 1 to 20, and most preferably from 3 to 10 to increase the effective reaction time and heat transfer efficiency; to reduce the silicon powder being taken out; and to reduce the reactor size and construction cost. When the reaction is multi-level, the remaining heat of exhaust gas in each level can be used to heat the next level of high purity granular silicon particles. Consequently, heat transfer efficiency and the effective reaction time are increased. For example, when the reaction is 3 levels, the heat transfer efficiency is improved by 60%, and the effective reaction time increased by 3 times. When the reaction is 6 levels, the heat transfer efficiency is improved by 80%, and the effective reaction time is increased by nearly 6 times.

FIG. 3 shows the schematic diagram of a multi-level reactor 200. The process is described as follows. High purity granular silicon seed is preheated gradually from a (pre-)heating unit 220 at the top of the reaction chamber by the multi-level reaction exhaust gas. When the high purity granular silicon seeds are heated to the desired temperature by the preheating unit 220 and the first stage heater 2201, the seeds enter the first stage reactor 2101 (shutter-like gas distributors on the left and the right sides are not shown) and reacts with the silicon-containing gas. Silicon is grown on the surfaces of the high-purity granular silicon seeds. The temperature of high purity granular silicon seeds becomes lower due to the endothermic decomposition reaction. The high purity granular silicon seeds are then introduced into the second stage heater 2202 and the second stage reactor 2102 for reaction. In the similar manner, high purity granular silicon seeds are introduced again into the third stage heater 2203 and the third stage reactor 2103 for reaction. Through the multi-level reactions, the particle size of high purity silicon grows gradually.

Additional clarifications are provided as follows.

First, the flow direction of the reaction gas can be perpendicular to the flow of the particles. It can also be presented at any other angle. Secondly, the residence time can be controlled by the diameters of the reaction chamber and the material circulation rate at every stage of reaction. Thirdly, silicon powder can be produced at all stages of reaction. A portion of the silicon powder can be carried into the next stage heating unit and then eventually be graded in the gas-solid separation unit (with a densely stacked high purity granular silicon bed layer). The silicon powder will be stopped and react, along with the high purity silicon, as new seed for the next level of reaction. Fourthly, a portion of high purity silicon powder can be carried with granular silicon down to the kneading reactor 204. The powder silicon is kneaded onto the bigger particles of high purity granular silicon surface in low concentration silicon gas or in the absence of non-silicon-containing gas (i.e., in the presence of inert gas), thereby making high purity granular silicon particles further grow up into a rounded shape.

The process avoids large amounts of dust when the high purity silicon powder enters the particle screening device 250 and results in fewer operational difficulties in the follow-up process. After screening process of high purity silicon granules in the particle screening device 250, larger particles enter the surface finishing unit 260, wherein the surface of high purity silicon granules are densely coated or ground polished with the lower concentration of silicon-containing gas or inert gas so that the surface of each high-purity silicon particle is bright and clean. High purity silicon granules with finished surfaces are cooled off by the cooling unit 280 and enter a packaging unit 290 for packaging. Smaller particles screened out by the screening unit 250 are introduced into the transportation unit 235 to return to the preheating unit 220, thus completing the cycle.

The exhaust gas from the primary preheating unit 220 is cooled to a lower temperature such as from about 100° C. to 200° C. The exhaust gas contains less silicon powder because of the filtration process of various heating units. After being separated from the exhaust separating unit 240, high purity gas is mixed with raw material gas and returned into the reactor, thus completing another cycle. The first channel 205 is an inlet for raw material gas, and the second channel 202 is an inlet for the auxiliary gas.

To reduce or avoid pollution of the silicon material under high temperature, the equipment for the reactor should possess sufficient mechanical strength. The present invention provides that the equipment material for the reactor is selected from high purity silicon, high purity silicon carbide, high purity silicon nitride, quartz or graphite, which will not diffuse impurities into the reaction at high temperature.

In the present invention, the reactor, heating units, and other units can be strategically arranged or directly connected. That is, heating units, filters, reactors, kneading units, and surface finishing units can be installed in different sections within the reaction chamber. It is also possible to separate the reactor from the heating unit. Specifically, one set of heating unit can be installed with a number of reactors. When one reactor is under maintenance, the others can continue to be operated with less down-time.

Operation procedures for producing high purity silicon granules are further described in combination with FIGS. 1 and 2.

Before the first start of the reaction, high purity granular silicon seeds are introduced through solid feeding port 101 (see FIG. 2). High purity granular silicon seeds will be naturally accumulated to form a dense high purity granular silicon bed layer 108, and the dense bed layer 108 is heated by the heating unit 20 (shown in FIG. 1) to the desired reaction temperature.

High purity reactive gases (silicon-containing gas and reducing gas $H_2$) are mixed under the pump pressure and are injected through raw material gas (jet) nozzles 104 into the high purity granular bed layer 108. At the same time, auxiliary gas hydrogen and/or inert gas are introduced into reaction chamber 10 by a pump from the auxiliary gas inlet 102 through the gas distributor 103. The reaction takes place inside of the reaction chamber 10, wherein silicon-containing gas undergoes a thermal decomposition process and forms a silicon layer on the surface of high purity granular silicon seed. The high purity granular silicon seeds keep growing gradually.

The exhaust gas is emitted, via an exhaust gas outlet 106 (FIG. 2), from reaction chamber 10 into the heating unit 20 and the gas-solid separation unit 30 (FIG. 1). Silicon powder in the exhaust gas is separated and collected by the gas-solid separation unit 30. The exhaust gas with remaining heat is returned into the heating unit 20 to provide heating for silicon particles and silicon powder. The heated high purity silicon granules are returned to the reaction chamber 10 for the reaction. The exhaust gas emitted from the heating unit 20 is introduced into the exhaust treatment unit 40, and it is separated by its components. The isolated gas is then recycled into reaction chamber through the inlet of reaction gas 105 or the inlet of the auxiliary gas 102.

High purity silicon granules (relatively large particle size) from the reaction chamber 10 are taken into screening unit 50 through a transportation unit 35. Particles with a desired particle size out of the screening unit 50 are treated inside the surface finishing unit 60, and are then cooled off by the cooling unit 80 to proceed with packaging in the packaging unit 90 to complete the production process. Smaller high purity silicon granules, which are separated out of the screening unit 50, are heated by the heating unit 20 to return to the reaction chamber 10 for the reaction again. If there is an insufficient volume of high purity granular silicon seed in the process, a portion of larger particles separated from the screening unit 50 may be directed into the high purity silicon pulverization unit 70. Large particles are ground in the pulverization unit 70 and heated by the heating unit 20. The ground particles are then returned to the reaction chamber 10 as high purity granular silicon seed.

To facilitate understanding, the present invention provides separate descriptions of the reaction chamber 10, the heating unit 20, the gas-solid separating unit 30, the screening unit 50, the surface finishing unit 60, and the like. In actual production, all the units can be combined in one set in a reaction chamber.

The present invention provides reactors for the production of high purity silicon granules. The method provides relative motion of the densely stacked high purity granular silicon bed layer, which avoids adhesion between the particles and reduces the volume of the reactor. The method further provides collection of high purity silicon powder in the densely stacked silicon bed from the exhaust gas to be used as seed. The method further provides that the reaction heat of exhaust is used to supplement heating of high purity granular silicon seed, thereby achieving large-scale, efficient, energy-saving, continuous, and low-cost production of high pure silicon particles.

Example 1

Implementation of the Present Invention: Reactor and Method of Producing of High Purity Silicon Granules.

See FIGS. 1 and 2, the example provides reactor and method for the production of high purity silicon granules, including the following steps.

High purity granular silicon seed is introduced into the reaction chamber 10 from the solid feeding port 101 to form the high purity granular silicon bed layer 108. High purity granular silicon seed in the high purity granular silicon bed 108 is densely distributed with a fill rate greater than 10%, preferably more than 50%. To reduce free space between high purity granular silicon particles in the silicon bed 108, various methods can be applied such as high pressure, spouted bed, and downstream operations with a moving bed. The specific measures may include: 1) increasing gas velocity through the control valve and using more fine-grained particles, thus changing a bubbling bed into a turbulent bed; 2) improving the particle size structure by optimizing and selecting desired high purity granular silicon particle size and particle size distribution, so that the particles form a solid condensed-type fluidized bed in loose style; such improvement including, for instance, reducing average particle size, widening particle size distribution, or increasing content of smaller particles to improve flow quality, increasing bed layer expansion, increasing two-phase exchange capacity, reducing short circuiting, and possibly eliminating the need for internal components; 3) using high pressure, since a pressure higher than atmospheric pressure can not only increase capacity, but also reduce the density difference between solid and gas; 4) using a high flow of fine particles to reduce back mixing, improving the efficiency of two-phase contact, enhancing heat transfer, and increasing production capacity; 5) circulating the gas spout internally, building a circulatory system in the reactor, so that particles and silicon bed layer are more condensed but do not plug the tube; 6) using a moving bed (vertical and horizontal, and tilt) to increase the packing density of particles and to reduce the free space, thus reducing gas powder production and accelerating the powder aggregation.

The high purity granular silicon bed layer 108 is heated at temperatures between 100° C. and 1400° C., and preferably between 300° C. and 1200° C. The heating method can include electrical connection of high purity granular silicon bed 108 with a power supply, that is, to add voltage on the high purity granular silicon bed 108 by using heat released from the electrical resistance of silicon itself. Similarly, the Siemens method can be used in which high-purity silicon rods are heated electronically. To reduce adhesion of the silicon particles during the production of the high purity silicon granules, it is necessary to create a state of relative motion of the high purity granular silicon in the high purity granular silicon bed layer 108.

The following methods can be used to impart a state of relative motion to the high purity granular silicon: 1) injecting the auxiliary gas and/or raw material gas into the reaction chamber 10, to set the high purity granular silicon bed 108 in motion; 2) introducing an external force, such as spraying, turning, stirring, mixing, vibration, or gravity flows, et al.; 3) subjecting the reactor 10 to another gravitational field (such as a centrifugal force field, etc.); 4) using a mixing bed; or 5) using a vibrating bed (including mechanical vibration, sonic or ultrasonic vibrations, plug-in vibration, etc.).

Auxiliary gas and raw material gas are imported through the auxiliary gas inlet 102 and the raw material gas inlet 105 and, ultimately, through the gas distributor 103. The auxiliary gas is $H_2$ and/or inert gas; the raw material gas is a silicon-containing gas or a silicon-containing gas with reducing gas $H_2$. The pressure in the reaction chamber 10 is from 0.1 to 100 bars, preferably from 0.1 to 50 bars.

The flow of the auxiliary gas and the raw material gas is not restricted by the minimum float velocity limit of traditional fluid bed. Gas flow can be less than the critical fluidization velocity (Umf); and the gas flow rate can be controlled between 0.01 Umf and 10 Umf for co-current flow. The method can bring the following benefits: saving gas flow, reducing heating and energy loss, and reducing pollution. The present invention provides a large operational range in the production. The amount of gas can be varied, more or less. The production does not have to be discontinued due to a temporary shortage of raw material gas.

The reaction exhaust gas is heated by preheating unit 20, and silicon particles contained in the exhaust gas, which are separated out by the gas-solid separation unit 30, are used as high purity granular silicon seed to supplement the reaction chamber 10. The heated silicon particles are returned to reaction chamber 10.

The heated reaction exhaust gas is separated through exhaust processing unit 40. The separated components of the gas are recycled into the reaction chamber 10 through the auxiliary gas inlet 102 and the raw material gas inlet 105. When the exhaust gas is recycled into the reaction chamber 10, it goes through the high purity granular silicon bed layer 108. The high purity silicon powder in the exhaust gas can be captured by the high purity silicon bed as a dust collector. That is, the high purity silicon powder will be collected and returned as high purity silicon seed when the exhaust gas passes through the high purity silicon bed layer.

The high purity silicon particle product is treated by the surface finishing unit 60 and collected after cooling. The surface finishing process can involve passing the high purity silicon product through the reaction chamber 10 with a low concentration of raw material gas at 0-10%; making the surface structure of the high purity silicon granules more compact.

Furthermore, in order to better capture the high purity silicon powder in the exhaust gas to be used as supplemental high purity granular silicon seed, the present invention also provides the following methods. The high purity silicon powder is separated from exhaust gas in the gas-solid separating unit 30. The process can also include by-passing the exhaust gas through the condensed high purity granular silicon bed (fill rate greater than 50%) to separate out the high purity silicon powder. Not only does it prevent the high purity silicon powder from being conveyed into downstream reaction, but also it is a simple and clean production of high purity granular silicon seed.

In order to produce uniform particle size of high purity silicon granules, the present invention also includes the following methods. The larger particles of high purity granular silicon are transmitted into the screening unit 50 through a transportation or conveyor unit 35. Particles that meet the requirements of particle size specification of high purity granular silicon are collected through sieving, while particles that do not meet the requirements are returned to reaction chamber 10 after heating in the heating unit 20. The method provides effective control of optimum particle size range of the product. It not only reduces the possibility of surface contamination (small particles can easily be contaminated due to large surface area), but also produces particles more conducive to downstream production steps. It is necessary to avoid direct contact of silicon particles and other types of material, especially metal, in order to prevent contamination from impurities that affect the product quality.

The present invention provides high purity granular silicon of particle size in the range of 1 mm to 20 cm, preferably 3 mm to 5 mm. Crystal size is no more than 30% of particle size, preferably 1 nm to 500 nm. Crystal size is the dimension of small single crystals in the particle. For example, 2 mm polycrystalline particles can include a number of small single crystal particles of different size (from 1 nm to 500 nm). The density of high purity silicon granules produced by this invention is optimally in the range of 1 g/cm$^3$ to 2.4 g/cm$^3$.

Furthermore, when there is still an insufficient amount of high purity silicon seed in the reaction chamber 10 after being supplemented from the gas-solid separating unit 30, the following methods can be used to supplement the seed. A portion of large particles of high purity silicon, which are screened out by the screening unit 50, is imported into the pulverization unit 70 for breaking down into smaller pieces. The pulverized particles can then be returned to the reaction chamber 10 as seed, after passing through the heating unit 20.

The present invention provides production of high purity silicon granules using one or more reaction stages, including from 1 stage to 50 stages; preferably from 1 stage to 20 stages; and most preferably from 3 stages to 10 stages.

In the production of high purity granular silicon, the following methods can be adopted for transportation or handling of materials.

1. Gravity Flow Method. The method relies on the gravity of the solid particles themselves to flow in and out of the reaction bed layer. To facilitate the flow of the solid particles, a small amount of gas can be introduced to the appropriate section of the pipeline to loosen up the solid particles.

2. Mechanical Transportation Method. Commonly used machines include screw conveyors, belt feeders, round plate feeders, star-shaped feeders, and bucket feeders, etc.

3. Pneumatic Transport Method.

The present invention provides relative motion of the densely stacked high purity granular silicon bed layer. It prevents the adhesion between particles and reduces the volume of the reactor. It utilizes the densely stacked high purity silicon bed layer to capture the silicon powder to be used as seed. It also utilizes the reaction heat from the exhaust gas to supplement heating of the high purity granular silicon, therefore achieving large-scale, efficient, energy-saving, continuous, and low-cost production of high purity silicon granules.

Example 2

The following is an example of the production of high purity granular silicon by the present invention.

10 kg of high purity granular silicon seed with diameters in the range of 0.1-2.0 mm was imported into a drum-shaped reactor with a 15-cm diameter. The reactor was heated by a medium frequency electric furnace. The high purity granular silicon seeds in the reactor were stirred by a multi-blade mixer to impart relative motion to the silicon particles inside of the densely stacked high purity granular silicon bed. When the temperature reached between 600° C. and 680° C., silicon-containing gas (silane) with a concentration of 50%-70% was imported into the reactor. The reaction time was 6.5 hours. The weight of silicon particles in the reactor was weighed at the end of the reaction. Total weight was increased by 4.35 kg. The production of 1.0 kg silicon consumed 3.45 kw power on average. The conversion rate of silane was 98%.

TABLE 1 shows the comparison of experimental data from two different reactors that produce high purity silicon granules. Data of Experiment 1 was from Example 2.

TABLE 1

Experimental Data from Two Different Reactors

|  | Experiment 1 | Experiment 2 |
| --- | --- | --- |
| Reactor | Loose spouted bed | Condensed stir bed |
| Temperature (° F.) | 600-680 | 600-680 |

TABLE 1-continued

Experimental Data from Two Different Reactors

|  | Experiment 1 | Experiment 2 |
|---|---|---|
| Composition of silane in argon (%) | 10 | 50-75 |
| Total weight increase of silicon particles (g) | 990 | 4350 |
| Reaction time (hours) | 10 | 6.5 |
| Silane conversion efficiency (%) | 79.5 | 98 |
| Power consumption per kg product (kwh/kg) | 12 | 3.45 |

FIGS. 4 and 5 provide optical micrographs of the cross-section of the high purity granular silicon product. It can be seen from FIGS. 4 and 5 that a first seed 401 and a second seed 501 is disposed in the center of the high purity silicon particle, and a first growth layer 503 is wrapped outside the seed layer 501. In FIG. 4, a large number of particles 402 is visible between the first growth layer 403 and the first seed 401. The particles 402 are silicon powder from the gas-phase reaction. During the reaction, the silicon powder was deposited onto the larger silicon seed particles. This deposition is described as a kneading effect: kneading silicon powder into granular silicon. By depositing portions of silicon powder onto granular silicon, the reaction rate can be accelerated, efficiency increased, and overall energy consumption reduced.

FIG. 6 provides an X-ray diffraction pattern of the high purity granular silicon product of the invention. It can be seen from FIG. 6 that characteristic sharp lines for silicon crystal with half peak width at 0.12°, indicating that the crystal size is greater than 1.0 μm in the silicon particles produced by the method.

A neutron activity analysis was conducted for the high purity silicon granules and particles of commercial electronic grade silicon. TABLE 2 shows the heavy metal content in ppm (parts per million) for the silicon particle product of the invention vs. commercial electronic grade silicon particles. TABLE 2 demonstrates that impurity level is similar for the high purity granular silicon product from the instant invention and the commercial electronic grade silicon particles. Therefore, the production of high purity silicon granules of the present invention has reached the commercial standard of electronic grade silicon particles.

TABLE 2

Comparison of Impurity Levels (in ppm) of Commercial Electronic Grade Silicon Particles and the Silicon Products of the Present Invention

| Element | Commercial electronic grade silicon particles | Products of the Present Invention |
|---|---|---|
| As |  | $4.13^{-4}$ |
| Au | $2.75^{-6}$ | $1.16^{-6}$ |
| Ce | $3.08^{-3}$ | $2.60^{-3}$ |
| Ga | $3.33^{-4}$ | $3.87^{-4}$ |
| La | $1.90^{-5}$ | $3.68^{-4}$ |
| Mo | $3.71^{-3}$ | $2.33^{-3}$ |
| Sc |  | $3.76^{-5}$ |
| Sm |  | $1.74^{-5}$ |
| Th |  | $2.20^{-5}$ |
| U |  | $8.47^{-5}$ |
| W |  | $5.00^{-4}$ |

Example 3

For Trichloride Silane ($SiHCl_3$) Deposition on Granular Polysilicon

As shown in FIG. 7, the reactor has a top (solid feeding) port 701 for addition of seeds, and a collection chamber 706 receives returning under sized granules from the bottom of the reactor via a transport system 735.

The granules travel downward and are heated in the heating section 720, and when the heated granules reach the reactor chamber 710, chemical vapor deposition occurs mainly on the surfaces of the granules, making the granules bigger and bigger. Once they leave the reaction chamber 710 (multiple sections or heating of the reactor is preferred), the granules are sorted by a sieving system 750. On-target sized granules exit through outlet port 752 for cooling and packaging. Under-sized granules return to the top of the reactor chamber (i.e., collection chamber 706) via the transportation system 735.

The reactor chamber 710 is shown in the insert, as having two shutter-like distributors 703, 713 at the opposite sides and two electrode plates 709 and 709A perpendicular to the distributors 703, 713 but parallel to the granule flow and the gas flow. By applying current between the two electrode plates 709, 709A (preferably made of an inert metal, such as Mo, W, or just silicon), the granules are further heated to a temperature between 1100° C. and 1200° C. Ways of making the reactor chamber 710 using polysilicon rods from the conventional Siemens process are shown below.

An incoming mixture of trichlorosilane (TCS) gas and hydrogen passes through a three-way valve 714 and is conveyed, via line 718, to the left side distributor 703 of the reactor chamber 710 and then is decomposed on the surfaces of the granules disposed between the distributors 703, 713. The exhaust gas exits through the right side distributor 713. The exhaust gas is collected through line 719 by quenching and then passes through a second three-way valve 715 and finally goes to exhaust gas treatment system (as shown in FIGS. 1 and 3) for separation and reuse of hydrogen, TCS, and silicon tetrachloride (STC), etc.

As time goes on, the silicon gradually deposits on the left-side distributor 703, making the spacing narrower. On the opposite side, the exhaust gas containing hydrochloride HCl, gradually etches away the silicon on the right-side distributor 713, expanding the spacing. A pressure gauge 721 located along line 722 monitors the pressure drop across the system between 716 and 717. Once the pressure drop reaches a pre-set level, the three-way valves 714 and 715 switch to allow incoming gas mixtures travelling along line 722 (with gauge 721) to enter the reactor through line 719, and the exhaust gas exits via line 718 and returns via line 723 (top) connected to 717 to the same exhaust gas treatment system. This will open the spacing of the left-side distributor 703. By repeating the procedure automatically, the reactor 710 can be operated for a long time without interruption. Similarly, the same approach can be applied using a second reactor system shown in FIG. 8.

For Silane Decomposition to Granular Polysilicon

As shown in FIG. 8, seeds are added via port 801, and hot returning granules, silane and hydrogen via port 836. The granular bed moves downward along with all gases. Silane is completely decomposed before reaching a distributor 803, which may have a circular structure as shown on the right. Alternately, it can be square or other shape so long as the configuration results in the separation of gas and solid at the lower portion. Hydrogen streams 802a, 802b, 802c, 802d, 802e, and 802f create a curtain on the internal surface of the chamber to prevent the silicon deposition on the wall.

The granules and gas travel downward to a heating zone 820a to increase the temperature of the bed. Additional silane is added via port 805a for further deposition and growth of the granules as they travel through distributors 813 and 823.

Further addition of silane via conduit 805*b* and heating by heating unit 820*b* causes more deposition to the granules, as silane is completely decomposed before reaching distributor 833. Pure hydrogen gas leaves the distributor 833 via conduit 842 for reuse or for other operations for silane production. Granules are sorted by a sieving system 850 and returned through port 852, which is similar to port 752 in FIG. 7. The system is usable for TCS decomposition as described herein.

FIG. 9 shows a two-zone reactor system 900 for silane decomposition. Cold granules travel downward through inlet port 901*a* into a granule bed 910*a* of the chamber 910, which is proximate to an in-coming flow of silane and hydrogen from port 905. The incoming gas mixtures warm up the granules, but do not cause serious deposition on the (left-side) distributor 903. However, once the granules reach the heated hot granule bed 910*b* on the right side, silane decomposes completely before reaching the right-side distributor 913. As a result, pure hydrogen exits from the port 942 on the right side of the reactor 910. In this way, long-term operation is assured. The cold granules and the heated granules travel to the next stage through conduits 901*c* and 901*d*.

FIG. 10 shows a submerged bed reactor for silane decomposition into granular polysilicon. High purity hydrogen (or $H_2$ and silane, silane being emitted from the center of the jet surrounded by hydrogen) is injected from the bottom of the reactor to stir or move the granular silicon in the bed, and silane is injected from the top of the reactor into the reactor. Since the top of the reactor chamber is sealed, all the gases (including $H_2$ and silane) are forced to penetrate the bed of granular polysilicon and exit through the shutter-like gas distributors on the sides of the reactor. On its way to the exit, all silane is completely decomposed into silicon on the surface of the granules, leaving hydrogen (along with primary diluting hydrogen) exiting through the distributor.

During the operation, small seeds are added into the reactor from the seed port on the top of the reactor, and large product granules are withdrawn from the product collection port for further treatment if necessary. During the entire course of the reaction, the bed granules are heated to maintain a reasonable temperature between 500° C. and 1200° C.

Similarly, a gas blender design can be used for the stirring and deposition of the bed. The gas can be introduced as a single jet spout or multiple jet spouts. However, it is preferred that the jets be introduced in a series of short pulses to create movement within the bed (which may create some embedded gas bubbles), but not penetrate the whole bed layer.

Granules Returning System

A conventional fluid bed reactor (FBR) for granular polysilicon production uses reacting gas to fluidize granules in the bed. It requires a large amount of gas during operation, especially when producing large sized granules. It requires a minimum gas flow to operate for a certain reactor design. The present system embodiments use alternative ways to move granules, and these embodiments have a wider operation window and are more flexible in operation. They are even independent to gas flow that is available.

FIG. 11 shows an economic way of transporting granules. At the lower portion of the reactor, granules flow into a silicon-lined insulated bucket 1034 (bottom dump or pourable) through a foldable silicon-lined conduit 1052. When the bucket 1034 is full (with load cell), the conduit 1052 is lifted by a gas spring 1053, and the granule flow is stopped. The bucket 1034 is lifted to the top of the reactor by a motor driven elevating system 1035 (moving through the intermediate position shown in the center drawing of FIG. 11). As shown in the right side of FIG. 11, a second conduit 1036 is extended. Silicone granules are poured into the top section of the reactor via the second conduit 1036. Once the bucket is empty, the top conduit 1036 is released, and the bucket 1034 returns to the bottom for refilling. The whole system should be operated in a hydrogen or inert gas (such as an Ar or He atmosphere) to prevent the granular silicon from experiencing oxidation. Many other ways can be designed around this approach. Valves can be used to regulate granule flow during loading and unloading of granules.

In addition to mechanical transport indicated above, a preferred method is to use a gas conveying system, such as a line vacuum by Exair (made from pure silicon and quartz by Sunnyside Technologies, Inc.) to transport granules continuously using hydrogen. Alternatively, a vacuum system can be used to transport granules to the top of the reactor periodically. The piping of the vacuum should have a silicon liner. Furthermore, pneumatic conveying systems using positive of negative pressure can be similarly used, provided the silicon-contacting surface is kept free of contamination. To achieve this clean environment, in addition to the silicon liner, silane gas can be added to the pneumatic system to deposit silicon on all internal surfaces to compensate for wear and to provide a contamination barrier in all the systems mentioned above.

Gas Inlet Ports

As all gas inlet ports are in direct connection with high temperature reactor, deposition inside the ports should be avoided. To prevent this deposition from occurring within the inlet ports, a conduit is designed that allows hydrogen to flow along the wall (parallel to the pipe or circling forward along the internal wall), while silane or TCS mixture flows through the central portion of the pipe. This configuration prevents the direct contact of silicon-containing gas with the internal wall of the pipe, thus eliminating the internal deposition. It is similar to the hydrogen curtain described with reference to FIG. 8 and also similar to a line vacuum described above, but with parallel or circulating flow of hydrogen.

Various Ways of Reactor Components Manufacturing

High purity graphite and quartz have been used for the liner of fluidized bed reactors for granular polysilicon production. It has been found that these materials will introduce impurities into the product. Using high purity silicon as the reactor liner was suggested previously, but no specific procedure of implementation has been described.

In the current disclosure, four procedures of using high purity silicon as a liner and system components for silicon products are employed. FIG. 12 is a schematic view of manufacturing a square double-shutter reactor chamber from single crystal ingot or polysilicon bar for granular polysilicon. This type of reactor chamber is used in systems shown in FIG. 3, FIG. 7, FIG. 9, and FIG. 10 respectively, for mainly cross-flow reactor operation.

FIG. 13 shows a schematic view of manufacturing a high purity polysilicon screen 1350 from single crystal slabs 1330 or polysilicon bar for sieving granular polysilicon.

FIG. 14 shows a schematic view of casting a high purity polysilicon blocks 1450 for the construction of large diameter reactor liner 1460.

FIG. 15 shows a schematic view of making complex components in silicon transport system component 1560 by casting using high purity silicon powder 1510 to form a green body 1520. The green body 1520 is then dried and sintered in vacuum or inert/reducing gases to form dense final components.

Finally, the embodiments described in the present invention merely illustrate general technical schemes. The invention is not limited to any specific embodiments, unless recited in the claims. Despite the detailed description referred to in the aforementioned embodiments of the present invention, one skilled in the art should understand that modifications can be made in the technical diagrams, and certain technical embodiments can be modified or replaced. However, such modifications are not necessarily deviations from the nature of spirit and scope of the invention.

I claim:

1. A system for production of high purity silicon particles, the system comprising:
    a solid feeding port through which silicon seed particles are introduced;
    a collection chamber in flow communication with the solid feeding port;
    a preheating section disposed downstream of the collection chamber;
    a reactor chamber downstream of the preheating section, the reactor chamber being configured to heat the silicon seed particles to a temperature between 100° C. and 1400° C. effective for rendering surfaces of the silicon seed particles amenable to chemical vapor deposition; wherein the reactor chamber comprises a raw material gas inlet, an auxiliary gas inlet, and a pair of oppositely disposed distributors including a first distributor in fluid communication with a flow of raw material gas and a second distributor in fluid communication with an outlet for an exhaust gas;
    wherein the first distributor and the second distributor define a space therebetween, the space being densely packed with silicon seed particles, such that the decomposition of the raw material gas and deposition of silicon on the silicon seed particles produces silicon granules having a size larger than the silicon seed particles;
    and wherein the silicon granules are collected within the reactor chamber between the first distributor and the second distributor.

2. The system of claim 1, wherein the raw material gas comprises a silicon-containing gas or a silicon-containing gas mixed with the auxiliary gas.

3. The system of claim 2, wherein the silicon-containing gas in the raw material gas is silane.

4. The system of claim 1, wherein the auxiliary gas is high purity $H_2$, an inert gas comprising argon, an inert gas comprising helium, or a mixture thereof.

5. The system of claim 1, wherein the preheating section comprises an outer jacket and an internal bed heat exchanger having electrode heating.

6. The system of claim 1, further comprising a sieving system for sorting silicon granules by size, wherein the silicon granules have a target size of between 1 mm and 20 mm.

7. The system of claim 6, wherein the sieving system is connected to an exit port, such that silicon granules of the target size are removed through the exit port.

8. The system of claim 6, further comprising a transportation system disposed between the sieving system and the collection chamber; and wherein the transportation system conveys silicon granules having a size smaller than the target size from the sieving system to the collection chamber.

9. The system of claim 8, wherein the transportation system is a solid transfer mechanism selected from the group consisting of a gravity flow mechanism, a mechanical transportation mechanism, and a pneumatic transport mechanism.

10. The system of claim 1, wherein the reactor chamber comprises surfaces in contact with the silicon seed particles and the silicon granules, the reactor chamber surfaces being made from high purity silicon, high purity silicon carbide, high purity nitride, quartz, or graphite.

11. The system of claim 1, wherein the reactor chamber possesses a height of between 1 meter and 100 meters.

12. The system of claim 1, wherein the reactor chamber comprises two reaction zones between the pair of distributors.

13. The system of claim 12, wherein the reactor chamber comprises a first reactor chamber fluidly coupled to a second reactor chamber, such that the solid feeding port supplies silicon seed particles to the first reactor chamber, and the first reactor chamber supplies the silicon seed particles and the silicon granules to the second reactor chamber.

14. The system of claim 1, wherein the pair of distributors are shutter distributors, resulting in a cross-flow of the raw material gas and the exhaust gas within the reactor chamber.

* * * * *